United States Patent [19]

Scriven et al.

[11] 4,147,679

[45] * Apr. 3, 1979

[54] WATER-REDUCED URETHANE COATING COMPOSITIONS

[75] Inventors: Roger L. Scriven; Wen-Hsuan Chang, both of Gibsonia, Pa.

[73] Assignee: PPG Industries, Inc., Pittsburgh, Pa.

[*] Notice: The portion of the term of this patent subsequent to Jan. 3, 1995, has been disclaimed.

[21] Appl. No.: 853,780

[22] Filed: Nov. 21, 1977

Related U.S. Application Data

[63] Continuation-in-part of Ser. No. 582,946, Jun. 2, 1976, Pat. No. 4,066,591.

[51] Int. Cl.$^2$ ............................................. C08L 75/12
[52] U.S. Cl. ........................ 260/29.2 TN; 204/159.11; 204/159.19; 204/181 C; 260/22 TN; 260/29.2 EP; 260/29.3; 260/29.4 R; 428/262; 428/425; 428/426; 428/457
[58] Field of Search ................ 260/29.2 TN, 29.2 M, 260/77.5 NP, 77.5AM, 77.5 CH; 428/425, 426

[56] References Cited

U.S. PATENT DOCUMENTS

| | | | |
|---|---|---|---|
| 3,488,272 | 1/1970 | Frisch et al. | 204/181 |
| 3,539,483 | 11/1970 | Keberle et al. | 260/29.2 |
| 3,686,108 | 8/1972 | Reiff et al. | 260/29.2 |
| 3,709,860 | 1/1973 | Fischer et al. | 260/77.5 AP |
| 3,799,854 | 3/1974 | Jerabek | 204/181 |
| 3,804,786 | 4/1974 | Sekmakas | 260/18 PT |

FOREIGN PATENT DOCUMENTS

| | | | |
|---|---|---|---|
| 919329 | 1/1973 | Canada | 260/29.2 |
| 1278426 | 6/1972 | United Kingdom | 260/29.2 |

*Primary Examiner*—Theodore E. Pertilla
*Attorney, Agent, or Firm*—William J. Uhl

[57] ABSTRACT

A water-diluted, ungelled, non-sedimenting polyurethane and a process for preparing such a polyurethane in an aqueous medium is disclosed. High molecular weight thermoplastic products are obtained by chain extending in aqueous medium an NCO polymer having a salt group equivalent weight of 6000 or less and substantially free of reactive hydrogen. The average functionality and equivalent ratio of the polyisocyanate and active hydrogen-containing materials used in making the NCO polymer, as well as the functionality of the chain extender, are carefully controlled so as to get high molecular weight ungelled products. Thermosetting compositions can be made by adding curing agent to the chain extended material. Curing agents can also be incorporated into the polymer molecule either in the making of the partially reacted NOC-containing prepolymer or by further reaction with the partially reacted NCO-containing prepolymer. The water-dispersed polyurethanes of the present invention are excellent film formers, capable of making coatings with a wide spectrum of desirable properties. In addition, they can be added to other water-compatible compositions to improve flexibility, hardness, drying and other coating properties.

32 Claims, No Drawings

WATER-REDUCED URETHANE COATING COMPOSITIONS

CROSS REFERENCE TO RELATED APPLICATIONS

This application is a continuation-in-part of copending application Ser. No. 582,946, filed June 2, 1975 U.S. Pat. No. 4,066,591.

BACKGROUND OF THE INVENTION

1. Field of the Invention

The present invention relates to polyurethane resins, more particularly, to water-dispersed polyurethane resins which are film formers.

2. Brief Description of the Prior Art

Water-dispersible polyurethanes are known in the art. For example, U.S. Pat. No. 2,968,575 to Mallonee discloses emulsifying NCO-containing prepolymers in a solution of diamine and water with the aid of detergents and under the action of powerful shearing forces. A chain lengthening reaction takes place as water and diamine diffuse into the droplets of the emulsion and react with the isocyanate. The resultant poly(urethane-urea) can then be further processed to form a coating. The process described in U.S. Pat. No. 2,968,575 has the disadvantage associated with it that in order to form the emulsion, a detergent must be used. The detergent usually finds its way into the resultant coating where it can seriously detract from the coating's overall physical and chemical properties. Besides, insufficient shearing force often results in unstable products, and the material can usually not be produced in typical reaction kettles because of the high shearing forces needed.

There have also been suggestions in the prior art to prepare fully reacted polyurethanes in organic solvent with internally contained salt groups which permit the polyurethane to be dispersed in water. For example, U.S. Pat. No. 3,479,310 to Dieterich et al discloses dispersing a fully chain extended, NCO-free polyurethane having internally contained ionic salt groups in water without the aid of detergent.

However, chain extended high molecular weight polyurethanes are very difficult to disperse satisfactorily in water. The resultant dispersions are fairly coarse and they require a high percentage of salt groups for stability. These high percentages of salt groups normally result in coatings which are moisture sensitive. In addition, because the high molecular weight polyurethanes are generally quite high in viscosity, they require extensive thinning with organic solvent before they have a sufficiently low viscosity for dispersion without high shearing forces. The excess solvent must later be removed by steam distillation or the like. Polyurethane dispersions of the present invention, on the other hand, which are prepared by first dispersing a low molecular weight partially reacted NCO-containing prepolymer which contains acid salt groups in an aqueous medium followed by chain extending in the aqueous medium, have a finely particulated dispersed phase. By chain extending in aqueous medium, we have found that only a relatively small percentage of salt groups is needed for satisfactory dispersion. In addition, the low molecular weight prepolymer materials have sufficiently low viscosities that they can be dispersed neat at room temperature or in the presence of small amounts of organic solvents. Further chain extension in water does not require additional solvent. It is believed that by making polyurethanes this way, the molecules of polyurethanes are coiled.

The idea of chain extending an NCO prepolymer with internally contained acid salt groups in water with an organic polyamine is generally expected to give gels due to the reaction of polyacids with polyamines. In fact, this method of making crosslinked polyurethanes was generally disclosed in Canadian Pat. No. 837,174, to Witt et al. This reference discloses the preparation of aqueous dispersions of highly crosslinked polyurethanes. The polyurethanes are prepared by dispersing an NCO-containing prepolymer which has internally contained acid salt groups in water. The prepolymer is reacted in water with a polyamine to give a highly crosslinked product. Crosslinking can also occur by using polyvalent counter ions of the ionic groups in the polymer. The process and the products prepared from the Witt et al process differ from the present invention in that they are highly crosslinked rather than ungelled, solvent-soluble products of the present invention. Highly crosslinked products are undesirable because they are not solvent-soluble and will not readily coalesce to form continuous films. For coating or adhesive usage, gel must be avoided. Witt et al do not teach how to make ungelled film-forming polyurethanes.

U.S. Pat. No. 3,868,350 discloses sedimenting aqueous solutions of thermoplastic polyurea powders made by reacting polyurethanes which contain free NCO groups and ionic groups with primary and/or secondary aliphatic diamines and/or dicarboxylic acid-bishydrazides at an NH to NCO ratio of from 0.1 to 0.95 in the presence of water. U.S. Pat. No. 3,868,350 acknowledges the difficulties in forming ungelled or uncrosslinked polyurethanes by further reaction of NCO-polymers with chain extenders in the presence of water. The means U.S. Pat. No. 3,868,350 has used to form ungelled products is to react an NCO-polymer of specified salt content with a stoichiometric deficit of a specified chain extender. The final polymer product must have specified urethane, urea and salt group content. Although the resultant products are ungelled, they suffer from numerous shortcomings. The products are sedimenting and not stable dispersions. As such, the sedimented product cannot be used to make coatings without intensive heating (e.g., powder coatings) or strong organic solvents to dissolve the powders. Thus, conventional coating techniques such as spraying, dipping, electrodepositing, electrostatic spraying cannot be employed. Further, since the products of U.S. Pat. No. 3,868,350 are prepared with specified chain extender in a stoichiometric deficit, and since the products must contain a specified urethane, urea and salt group content, products of only a limited range of physical and chemical properties can be produced. Finally, although the patent mentions that the urethane dispersions can be combined with crosslinking agents, there is no disclosed means of how this may be accomplished.

Therefore, from the above, there are numerous shortcomings in the prior art relating to water-dispersed, ungelled polyurethanes. It is surprising that ungelled polyurethane dispersions can be prepared by the present invention. Besides, the polyurethane dispersions of the present invention are also surprisingly superior to those of the prior art, overcoming many of their shortcomings. The polyurethane dispersions of the present invention are ungelled, solvent-soluble materials which are excellent film formers. They can easily be prepared not requiring detergent, high shearing forces, high temperatures or excessive amounts of organic solvent for a satisfactory dispersion. The polyurethane dispersions of the present invention can be prepared extremely fine, making the dispersion stable or non-settling. By this is meant that after the dispersion is prepared, the dispersed phase remains in dispersion and will not form hard sediments. They cannot be filtered by regular means. Besides being non-sedimenting, fine particle size dispersions are advantageous because they have a high surface energy associated with them. This results in a strong driving force for coalescing, and in coatings having surprisingly fast drying times. The polyurethanes of the present invention, although prepared in water, can be deposited as a coating which, when desired, is insensitive to humidity and moisture, which is an unusual combination of properties. Coatings prepared with the polyurethane dispersions of the present invention can be made with outstanding elastomeric properties such as high tensile strength, good ultimate elongation, excellent impact resistance and hardness, in addition to excellent solvent and humidity resistance.

SUMMARY OF THE INVENTION

According to the present invention, a non-sedimenting, essentially emulsifier-free aqueous dispersion of an ungelled polyurethane having a particle size less than 10, preferably less than 5 microns, formed by reacting in aqueous medium in which water is the principal ingredient:

(A) an NCO-containing polymer containing acid salt groups having monovalent counter ions having a salt group equivalent weight of 6000 or less and being substantially free of reactive active hydrogen formed from:
  (1) an organic polyisocyanate and
  (2) an active hydrogen-containing material; said organic polyisocyanate, said active hydrogen-containing material containing a total of not more than one gram-mole of compounds having an average functionality of 3 or more per 500 grams of organic polyisocyanate and active hydrogen-containing material; said NCO-containing polymer having an NCO/active hydrogen equivalent ratio of at least 4/3;

(B) active hydrogen-containing compound having an active hydrogen functionality of 2 or less in which the active hydrogens are more reactive with NCO groups than water to form a polyurethane with an intrinsic viscosity less than 2.0 deciliters per gram.

The final reaction product can be used for either thermoplastic or thermoset coatings. For thermosetting polymers, the final reaction product is either blended with suitable curing agents or contain suitable curing agent groups or both such that after the coating is applied, cross-linking can be induced to produce a durable thermoset coating.

DETAILED DESCRIPTION

The polyurethanes of the present invention are extremely dispersible in aqueous medium, much better than would be expected from the prior art such as U.S. Pat. No. 3,479,310 to Dieterich et al mentioned above. By better dispersibility or improved dispersibility is meant the polyurethanes can be dispersed in water with relatively few acid salt groups and form a finely particulated dispersed phase. Although not intending to be bound by any theory, the reasons we believe the products of the invention have improved dispersibility is first, the NCO-containing prepolymer is of relatively low molecular weight; secondly, by dispersing the low molecular weight NCO-containing prepolymer in water, water competes with the chain extender for reaction with the NCO groups. Although the chain extender is more reactive with the NCO groups than water, water is believed in many instances to react to a minor degree to form urea linkages and salt of carbamic acid. The surprising good dispersibility and product properties are difficult to explain. We believe these reactions can be responsible. Determination that water participates in the reaction can be made by dispersing an NCO-containing prepolymer in a mixture of chain extender and water or in water itself and then adding a chain extender to the dispersion. In either instance, when an equivalent amount of chain extender to NCO prepolymer is used, the amount of chain extender remaining at the completion of the chain extension reaction is an indication of side reactions of the NCO prepolymer with water. The extent of the reaction with water will depend on how much more active the chain extender is with the NCO groups than water, the relative amounts of water and chain extender present in the dispersion and the time the NCO prepolymer is dispersed in water before a chain extender is added.

While it is relatively easy to make gelled products such as disclosed by the aforementioned Witt et al patent, the preparation of non-gelled products is difficult. In the practice of the invention, reaction conditions are controlled and reactants carefully selected so as to get an ungelled product. Whether or not a reaction mixture will gel is difficult to determine beforehand. A method based on trial and error is the only sure way to determine whether or not a set of reactants under specific reaction conditions will gel. However, a few general guidelines based on our personal experiences in working with the polyurethane dispersions of the present invention can be given. As will be described in more detail later, the NCO-containing polymer is prepared from reacting an organic polyisocyanate and an active hydrogen-containing compound having an average of at least two active hydrogens, some of which contain salt or salt forming groups. The prepolymer is then chain extended in water with another active hydrogen-containing compound such as an organic amine. In the preparation of the NCO-polymer, if an approximately 4:3 equivalent ratio of polyisocyanate to active hydrogen-containing compound is used and the reaction permitted to go to completion, a very high molecular weight prepolymer which is difficult to disperse will result. If either or both of the reactants are trifunctional or of greater functionality, the product in most instances will be a gel and not be dispersible at all. However, if the reactants are difunctional or contain a considerable amount of monofunctional ingredients to reduce the average functionality of the system, and reaction conditions are controlled to limit the molecular weight, a readily dispersible prepolymer will result. This product can then be chain extended to form a useful product. However, the functionality, amount of chain extender and reaction conditions must be carefully controlled. A chain extender having an average functionality of greater than 2 would probably gel such a high molecular weight product if used in a stoichiometric amount with the ureacted NCO in the prepolymer. However, gelling could probably be avoided if a sufficient excess of chain extender were used or if a sufficient amount of monofunctional chain extender or a chain extender with drastically different reactive groups were used to reduce the average functionality of the chain extender. In most instances, the use of a monofunctional chain extender along would cause no problems and would result in an ungelled product.

Even though care must be taken to avoid gelling, we have found that the polyurethanes of the present invention prepared in aqueous medium have less tendency to gel than comparable polyurethanes prepared in organic solvent. Thus, ungelled products of the invention can be prepared in aqueous medium with trifunctional or higher functionality reactants, whereas similar products would gel if prepared in organic solvent. This is somewhat surprising since the aforementioned U.S. Pat. No.3,868,350 shows only difunctional reactants in the preparation of the thermoplastic polyurea powders.

The polyurethane dispersions of the present invention are ungelled and essentially emulsifier free. By the term "ungelled" or "non-gelled" is meant the dispersed resin is substantially free of crosslinking and has an intrinsic viscosity when dissolved in a suitable solvent without depolymerization. The intrinsic viscosity of such a product is an indication of molecular weight. A gelled polyurethane, on the other hand, since it has an essentially infinitely high molecular weight, will have an intrinsic viscosity too high to measure.

The intrinsic viscosity of various resins are determined by art-recognized methods. Thus, the intrinsic viscosity of the resins of the present invention may be determined by first acidifying the resin. The aqueous solvent is removed either by evaporation or decantation. The acidified resin solid is then dissolved in N-methyl pyrrolidone or other suitable solvent at a concentration of from 8 to 30 percent. This solution is further thinned with dimethyl formamide to 0.5 percent and 0.25 percent concentrations. The resins may then be passed through a capillary viscometer to determine the reduced viscosities.

The intrinsic viscosity of the resin will then be determined by the following equation:

$$[\mu] = [\mu \text{ reduced}]_{C=O} = [\mu \text{ reduced}]_{0.25} + [[\mu \text{ reduced}]_{0.25} - [\mu \text{ reduced}]_{0.50}] = 2[\mu \text{ reduced}]_{0.25} - [\mu \text{ reduced}]_{0.50}$$

where $[\mu]$ is intrinsic viscosity and $[\mu \text{ reduced}]_{0.25}$ is the reduced viscosity of 0.25 percent concentration and $[\mu \text{ reduced}]_{0.50}$ is the reduced viscosity of 0.50 percent concentration. The general methods of determining reduced viscosities are described in the art such as *Textbook of Polymer Science*, Billmeyer, Interscience Publishers, New York, 1957, pages 79-81.

The polyurethane polymers of the present invention have intrinsic viscosities lower than 4.0 deciliters per gram, and preferably lower than 2.0 deciliters per gram, and most preferably within the range of 0.1 to 1.5 deciliters per gram; the intrinsic viscosities being determined for anionic polymers on the acid form of the polymer; for non-quaternized cationic polymers on the basic form of the polymer; and for quaternized polymers on the ionic form of the prepolymer itself.

By the term "essentially emulsifier free" is meant that the polyurethane dispersion usually needs no externally added emulsifiers or detergent to maintain its stability, although, of course, emulsifiers may be used if desired. Polyurethane dispersions of the present invention are very stable in that once they are dispersed, they will not settle or flocculate and cannot be filtered by conventional techniques.

The organic polyisocyanate which is used in the instant invention can be an aliphatic or an aromatic polyisocyanate or mixture of the two. Aliphatic polyisocyanates are preferred since it has been found that these provide better color stability in the resultant coating. Also, diisocyanates are preferred although higher polyisocyanates can be used in place of or in combination with diisocyanates and/or monoisocyanate. As indicated above, the average functionality of the reactants used in making the NCO-polymer is important in controlling the tendency of the polymer to gel. Where higher functionality polyisocyanates are used, some monofunctional isocyanate should be present to reduce the average functionality. Examples of suitable higher polyisocyanates are 1,2,4-benzene triisocyanate and polymethylene polyphenyl isocyanate. Examples of suitable monoisocyanates are cyclohexyl isocyanate, phenyl isocyanate and toluene isocyanate. Examples of suitable aromatic diisocyanates are 4,4'-diphenylmethane diisocyanate, 1,3-phenylenediisocyanate, 1,4-phenylene diisocyanate and tolylene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed and are actually preferred because of color stability and imparting hardness to the product. Examples include 1,4-cyclohexyl diisocyanate, isophorone diisocyanate, alpha, alpha-xylylene diisocyanate and 4,4'-methylene-bis(cyclohexylisocyanate). This particular polyisocyanate is preferred and is commercially available from E. I. du Pont de Nemours and Company under the trademark HYLENE W ®. Substituted organic polyisocyanates can also be used in which the substituents are nitro, chloro, alkoxy and other groups which are not reactive with hydroxyl groups or active hydrogens and provided the substituents are not positioned to render the isocyanate group unreactive. Examples include compounds having the structure:

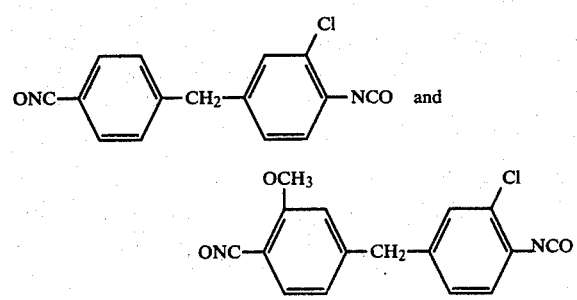

There can also be employed isocyanate-terminated adducts of diols or polyols such as ethylene glycol, 1,4-butylene glycol, polyalkylene glycol and the like. These are formed by reacting more than one equivalent of the diisocyanate, such as those mentioned with one equivalent of diol or polyalcohol to form a diisocyanate product.

Thioisocyanates corresponding to the above-described can be employed as well as mixed compounds containing both an isocyanate and a thioisocyanate group. The terms "polyisocyanate" and "diisocyanate," as used in the present specification and claims, are intended to cover compounds and adducts containing thioisocyanate groups or isocyanate groups and compounds and adducts containing both isocyanate and thioisocyanate groups.

Any suitable organic compound containing active hydrogens may be used for reaction with the organic polyisocyanate to form the partially reacted NCO-containing polymers of the present invention. The term "active hydrogen atoms" refers to hydrogens which, because of their position in the molecule, display activity according to the Zerewitinoff test. Accordingly, active hydrogens include hydrogen atoms attached to oxygen, nitrogen, or sulfur, and thus useful compounds will include those having at least two of these groups (in any combination) —OH, —SH,

and —NH$_2$. The moieties attached to each group can be aliphatic, aromatic, cycloaliphatic or of a mixed type not including carbonyl, phosphonyl or sulfonyl linkages.

Examples of such compounds include amines, which includes polyamines, aminoalcohols, mercapto-terminated derivatives, and alcohols, which includes polyhydroxy materials (polyols) which are preferred because of the ease of reaction they exhibit with polyisocyanates. Alcohols and amines generally give no side reactions, giving higher yields of urethane (or urea) product with no by-product and the products are hydrolytically stable. Also, with regard to polyols, there are a wide variety of materials available which can be selected to give a wide spectrum of desired properties. In addition, the polyols have desirable reaction rates with polyisocyanates. Both saturated and unsaturated active hydrogen-containing compounds can be used, but saturated materials are preferred because of superior coating properties.

The amines which can be employed in the preparation of the urethanes of the invention can be primary or secondary diamines or polyamines in which the radicals attached to the nitrogen atoms can be saturated or unsaturated, aliphatic, alicyclic, aromatic, aromatic-substituted aliphatic, aliphatic-substituted aromatic or heterocyclic. Mixed amines in which the radicals such as, for example, aromatic and aliphatic can be employed and other non-active groups can be present attached to the carbon atom, such as oxygen, sulfur, halogen or nitroso. Exemplary of suitable aliphatic and alicyclic diamines are the following: 1,2-ethylene diamine, 1,2-propylene diamine, 1,8-menthane diamine, isophorone diamine, propane-2,2-cyclohexyl amine, methane-bis-(4-cyclohexyl amine), and

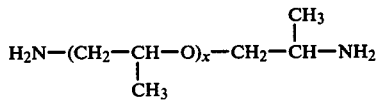

where x = 1 to 10.

Aromatic diamines such as the phenylene diamines and the toluene diamines can be employed. Exemplary of the aforesaid amines are: o-phenylene diamine and p-tolylene diamine. N-alkyl and N-aryl derivatives of the above amines can be employed such as, for example, N,N'-dimethyl-o-phenylene diamine, N,N'-di-p-tolyl-m-phenylene diamine, and p-aminodiphenylamine.

Polynuclear aromatic diamines can be employed in which the aromatic rings are attached by means of a valence bond such as, for example, 4,4'-biphenyl diamine, methylene dianiline and monochloromethylene dianiline.

The use of amines dissolved in ketones is sometimes desirable because of better control over reaction conditions.

Besides the amines mentioned above, hydrazines and hydrazides such as are described later in the specification can also be employed.

Aminoalcohols, mercapto-terminated derivatives and mixtures, and the like, hydroxy acids and amino acids can also be employed as the active hydrogen compounds. Examples are: monoethanolamine, 4-aminobenzoic acid, aminopropionic acid, N-(hydroxyethyl)ethylene diamine, 4-hydroxybenzoic acid, p-aminophenol, dimethylol propionic acid, hydroxy stearic acid, and beta-hydroxypropionic acid. When amino acids are used, additional basic material should also be present to release NCO-reactive amines from Zwitterion complexes.

To degress for a moment, the active hydrogen-containing compound can, if desired, contain functional moieties which are capable of further reaction to cure the product. Examples would be active hydrogen-containing compounds which contained acrylic unsaturation which would enable the coating to be cured by ultraviolet light with vinyl monomers. Various curing mechanisms will be described in more detail later.

The polyhydroxyl materials or polyols can be either low or high molecular weight materials and in general will have average hydroxyl values as determined by ASTM designation E-222-67, Method B, between about 1000 and 10, and preferably between about 500 and 50. The term "polyol" is meant to include materials having an average of two or more hydroxyl groups per molecule.

The polyols include low molecular weight diols, triols and higher alcohols, low molecular weight amide-containing polyols and higher polymeric polyols such as polyester polyols, polyether polyols and hydroxy-containing acrylic interpolymers.

The low molecular weight diols, triols and higher alcohols useful in the instant invention are known in the art. They have hydroxy values of 200 or above, usually within the range of 1500 to 200. Such materials include aliphatic polyols, particularly alkylene polyols containing from 2 to 18 carbon atoms. Examples include ethylene glycol, 1,4-butanediol, 1,6-hexanediol; cycloaliphatic polyols such as 1,2-cyclohexanediol and cyclohexane dimethanol. Examples of triols and higher alcohols include trimethylol propane, glycerol and pentaerythritol. Also useful are polyols containing ether linkages such as diethylene glycol and triethylene glycol and oxyalkylated glycerol.

Also useful are low molecular weight amide-containing polyols having hydroxyl values of 100 or above. These materials are described in U.S. Pat. application Ser. No. 405,713, filed Oct. 11, 1973, to Chang and assigend to PPG Industries, Inc., the assignee of the present invention, on page 8, line 19, to page 12, line 23, the portions of which are hereby incorporated by reference. When these low molecular weight amide-containing polyols are incorporated into the polymer, they enhance its water dispersibility.

Where flexible and elastomeric properties are desired, the partially reacted NCO-containing polymer should preferably contain at least a portion of a higher molecular weight polymeric polyol. Such a polymeric polyol should be predominantly linear (that is, absence of trifunctional or higher functionality ingredients) to avoid gelling of the resultant polymeric product and should have a hydroxyl value of 200 or less, preferably within the range of about 150 to 30.

The most suitable polymeric polyols include polyalkylene ether polyols including thio ethers, polyester polyols including polyhydroxy polyesteramides and hydroxyl-containing polycaprolactones and hydroxy-containing acrylic interpolymers.

Any suitable polyalkylene ether polyol may be used including those which have the following structural formula:

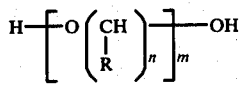

where the substituent R is hydrogen or lower alkyl including mixed substituents, and n is typically from 2 to 6 and m is from 2 to 100 or even higher. Included are poly(oxytetramethylene) glycols, poly(oxyethylene) glycols, polypropylene glycols and the reaction product of ethylene glycol with a mixture of propylene oxide and ethylene oxide.

Also useful are polyether polyols formed from the oxyalkylation of various polyols, for example, glycols such as ethylene glycol, 1,6-hexanediol, Bisphenol A, and the like, or higher polyols, such as trimethylol propane, pentaerythritol and the like. Polyols of higher functionality which can be utilized as indicated can be made, for instance, by oxyalkylation of compounds as sorbitol or sucrose. One commonly utilized oxyalkylation method is by reacting a polyol with an alkylene oxide, for example, ethylene or propylene oxide, in the presence of an acidic or basic catalyst.

Besides poly(oxyalkylene) glycols, any suitable polyhydric polythioether may be used such as, for example, the condensation product of thioglycol or the reaction product of a polyhydric alcohol, such as disclosed herein for the preparation of hydroxyl polyesters, with thioglycol or any other suitable glycol.

Polyester polyols can also be used as a polymeric polyol component in the practice of the invention. The polyester polyols can be prepared by the polyesterification of organic polycarboxylic acids or anhydrides thereof with organic polyols. Usually, the polycarboxylic acids and polyols are aliphatic or aromatic dibasic acids and diols.

The diols which are usually employed in making the polyester include alkylene glycols, such as ethylene glycol and butylene glycol, neopentyl glycol and other glycols such as hydrogenated Bisphenol A, cyclohexane diol, cyclohexane dimethanol, caprolactone diol (for example, the reaction product of caprolactone and ethylene glycol), hydroxy-alkylated bisphenols, polyether glycols, for example, poly(oxytetramethylene) glycol and the like. However, other diols of various types and, as indicated, polyols of higher functionality can also be utilized. Such higher polyols can include, for example, trimethylol propane, trimethylol ethane, pentaerythritol, and the like, as well as higher molecular weight polyols such as those produced by oxyalkylating low molecular weight polyols. An example of such high molecular weight polyol is the reaction product of 20 moles of ethylene oxide per mole of trimethylol propane.

As has been mentioned above, some monofunctional alcohol such as n-propyl alcohol and n-butyl alcohol can be used.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and other dicarboxylic acids of varying types. The polyester may include minor amounts of monobasic acid, such as benzoic acid, stearic acid, acetic acid, hydroxy stearic acid and oleic acid. In an interesting embodiment, we have found that larger amounts of a monobasic acid such as benzoic acid can be combined with sucrose to make effectively difunctional sucrose pentabenzoate. This difunctional material can then be reacted with various other ingredients and isocyanates to form polyurethanes having enhanced durability. Also, there may be employed higher polycarboxylic acids such as trimellitic acid and tricarballylic acid (where acids are referred to above, it is understood that the anhydrides of those acids which form anhydrides can be used in place of the acid). Also, lower alkyl esters of acids such as dimethyl glutarate can be used. It is preferred that the polyester include an aliphatic dicarboxylic acid as at least part of the acid component.

Besides polyester polyols formed from polybasic acids and polyols, polycaprolactone-type polyesters can also be employed. These products are formed from the reaction of a cyclic lactone such as epsilon-caprolactone with a polyol or a hydroxy acid. Such products are described in U.S. Pat. No. 3,169,949 to Hostettler, the portion of this patent relating to the description of polycaprolactone polyols being incorporated by reference. Although not disclosed in the aforementioned patent, the product of cyclic lactone with an acid-containing polyol can also be used. The reaction of urea and caprolactone such as described in U.S. Pat. No. 3,832,333 to Chang et al can also be used.

While polyester polyols have been specifically disclosed, it is to be understood that useful products are also obtainable by substituting a polyesteramide polyol, or a mixture of polyesteramide polyols for part or all of the polyester polyol. The polyesteramide polyols are produced by conventional techniques from the above-described acids and diols, and minor proportions of diamines or aminoalcohols. Suitable diamines and aminoalcohols include hexamethylene diamine, hydrazine, bis(4-aminocyclohexyl) methane, diethylene triamine, ethylene diamine, ethanolamine, phenylene diamine, toluene diamine and poly(amide-amines) such as the VERSAMIDS ® sold by General Mills, and the like. It is to be understood that the polyester polyols of the instant invention include such polyesteramide polyols.

In addition to the higher molecular weight polyether and polyester polyols, hydroxy-containing acrylic interpolyers can also be employed. These products are described in U.S. Pat. application Ser. No. 392,585, filed on Aug. 29, 1973, to Chang et al and assigned to PPG Industries, Inc., the assignee of the present invention, on pages 5 and 6, the portions of which are hereby incorporated by reference.

The higher polymeric polyol component is preferably combined with the low molecular weight polyol described above. It has been found that by blending high and low molecular weight polyols, optimum properties can be obtained in the resultant NCO-containing prepolymer. Preferably, the polymeric polyol is the major component, being present in an amount of about 25 to 95 percent by weight based on total weight of the polyol used to prepare the NCO-containing prepolymer, the remainder being low molecular weight polyol.

In order to make oxidative, curable materials and coatings with hydrophobic properties, drying oils or semi-drying oils can be incorporated into the prepolymer. By drying oil or semi-drying oil is meant the hydroxyl-containing reaction products of fatty acids and polyols. Other modifying acids such as unsaturated and aromatic acids can also be used. The fatty acids are characterized by containing at least a portion of unsaturated fatty acids. The hydoxyl-containing material is often prepared by reacting a triglyceride, for example, safflower oil, with pentaerythritol so that an exchange reaction takes place between the two compounds. Another method of preparation is to partially esterify a polyol with an unsaturated fatty acid. Generally, drying oils are those which have iodine values of about 130 or higher, and the semi-drying oils are those which have an iodine value of about 90 to 130 as determined by method ASTM D-1467. Examples of such oils include linseed oil, soya oil, safflower oil, perilla oil, tung oil, oiticica oil, poppyseed oil, sunflower oil, tall oil esters, walnut oil, dehydrated castor oil, herring oil, menhaden oil, sardine oil, and the like.

When oils are incorporated into the polymer, higher amounts of water-solubilizing groups which are described in more detail later may be necessary to achieve satisfactory dispersion.

As mentioned above, the average functionality of the reactants used in making the NCO-polymer is important in controlling the tendency of the polymer to gel. Where higher functionality active hydrogen-containing materials such as trifunctional and higher functionality materials are used, the use of some monofunctional active hydrogen-containing compound is preferred.

The partially reacted NCO-containing polymer also contains salt groups such as acid salt groups which can be selected from the class consisting of $-OSO_3^{\ominus}$, $-OPO_3^{\ominus}$, $COO^{\ominus}$, $SO_2O^{\ominus}$, $POO^{\ominus}$ and $PO_3^{\ominus}$. The prepolymer can be prepared with reactants containing the acid salt group, or, as is more normally the case, can be prepared with free acid groups which can be subsequently neutralized afer prepolymer formation. Suitable materials for introducing acid groups into the partially reacted NCO-containing polymer are materials which contain at least one active hydrogen atom reactive with isocyanate groups or at least one isocyanate group, and at least one group capable of salt formation. Preferably, the acid group is in the active hydrogen material because isocyanates containing acid groups are not stable.

Specific examples of compounds which contain active hydrogens and acid groups capable of salt formation are hydroxy and mercapto carboxylic acids. Examples include dimethylol propionic acid, glycollic acid, thioglycollic acid, lactic acid, malic acid, dihydroxy malic acid, tartaric acid, dihydroxy tartaric acid, and 2,6-dihydroxybenzoic acid. Other examples of compounds which contain active hydrogens and acid groups are aminocarboxylic acids, aminohydroxy carboxylic acids, sulfonic acids, hydroxy sulfonic acids and aminosulfonic acids. Examples include oxaluric acid, anilido acetic acid, glycine, alpha-alanine, 6-amino caproic acid, reaction product of ethanolamine and acrylic acid, hydroxy ethyl propionic acid, 2-hydroxyethane sulfonic acid and sulphanilic acid. As mentioned above, amino acids must be used in the presence of a base such as KOH or a tertiary amine. Other examples include bis-hydroxymethyl-phosphinic acid, trimethylol propane monophosphate and monosulfate, N-hydroxyethyl-aminomethylphosphonic acid.

Suitable salt forming agents for acid group-containing compounds include inorganic and organic bases such as sodium hydroxide, potassium hydroxide, ammonia and tertiary amines.

Besides acid salt groups which are anionic and are preferred, the partially reacted NCO-containing polymer can contain cationic salt groups which can be selected from the class consisting of

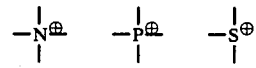

and mixed groups. The prepolymer can be prepared with reactants containing the cationic salt groups, or as is more normally the case, prepolymers containing suitable precursors can be converted to the cationic salt by adding a quaternizing or neutralizing agent to the prepolymer. Suitable materials for introducing cationic groups into the partially reacted NCO-containing prepolymer are materials which contain at least one active hydrogen atom reacted with isocyanate groups, or at least one isocyanate group and at least one group capable of cationic salt formation.

Examples of classes of materials which can be used are the following: compounds which have acid neutralized primary or secondary amino groups, basic tertiary amino groups, tertiary phosphino groups which can be neutralized with acid or quaternized with quaternizing agent; compounds which contain halogen atoms capable of quaternizing reactions; compounds which contain epoxy groups which are reactive with acid plus amines or phosphines to form acid salts or quaternary groups, and which are reacted with acids plus sulfides to form acid salts or ternary sulfonium groups.

Specific examples of compounds which have active hydrogens and basic tertiary amino groups are aliphatic, cycloaliphatic, aromatic and heterocyclic amino alcohols, diols and triols. Examples include N,N-dimethylethanolamine, N-methyl-N-(beta-hydroxyethyl)-aniline, N-hydroxy-ethylpiperidine, methyl diethanolamine, cyclohexyl diethanolamine, N,N-(bishydorxyethyl)aniline, N,N-bis(hydroxyethyl)-alpha-aminopyridine. Other specific examples are amines, diamines, triamines and amides such as N,N-dimethyl hydrazine, N,N-dimethyl ethylenediamine, alpha-aminopyridine, N-aminopropyl-ethylene imine and bis-(3-aminopropyl)-methylamine. The above materials can be converted into cationic salt groups with inorganic and organic acids such as hydrochloric acid, phosphoric acid, acetic acid, glycollic acid, and lactic acid. Another way to convert into cationic groups is by using alkylating agents such as $(CH_3O)_2SO_2$, $CH_3I$ and $C_2H_5Br$.

Specific examples of compounds which contain active hydrogen and halogen atoms capable of quaternizing reactions are 2-chloroethanol and 3-bromopropanol.

Examples of compounds which contain isocyanates and halogens capable of quaternizing reactions are chlorohexyl isocyanate, N-(4-methyl-3-isocyanato-phenyl)-o-beta-bromoethylcarbamate.

The compounds described immediately above containing halogen atoms capable of quaternizing reactions may be quaternized with tertiary amines and phosphines or ternated with sulfides. Quaternary ammonium and phosphonium or ternary sulfonium salts are then formed. The following are specific examples: trimethylamine, pyridine, triethanolamine, dimethylsulfide, thioglycol, thioglycollic acid and trialkyl phosphines.

Specific examples of active hydrogen-containing compounds which contain epoxy groups which are reactive with amines and phosphines to form tertiary acid salts and quaternary groups, and which are also reactive with sulfides to form ternary sulfonium groups are hydroxy-containing mono- or diepoxides such as

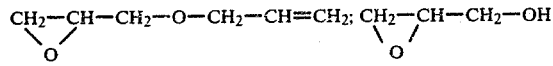

and 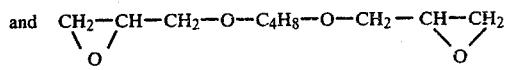

The reaction of epoxy-containing materials with tertiary amines to form quaternary ammonium groups is described in U.S. Pat. No. 2,676,166 to Webers; the reaction of epoxy materials with tertiary phosphines is described in U.S. Pat. No. 3,429,839 to Franco and the reaction of epoxy compounds with sulfides to form ternary sulfonium groups is described in U.S. Pat. No. 3,793,278 to DeBona.

Besides using ionic solubilizing groups as described above, non-ionic solubilizing groups can also be incorporated into the polymer. Non-ionic groups remain in the polymer structure even after the coating has been applied, and introduce hydrophilicity into the coating which severely detracts from the moisture resistance of the coating. Ionic groups, on the other hand, such as amine salts of carboxylic acids can be decomposed after the coating has been applied such as by baking and are therefore not present to affect the hydrophilicity of the resultant coating. Also, ionic groups, particularly anionic groups which are preferred, are more effective in dispersing the prepolymer.

As with the ionic solubilizing groups, non-ionic solubilizing groups can be incorporated into the prepolymer through the isocyanate or through the active hydrogen component of the prepolymer. Examples of non-ionic water solubilizing groups are ethylene oxide moieties which should constitute not more than 50 percent by weight of the prepolymer and which can be incorporated into the prepolymer using polyethylene glycols or NCO-terminated urethane modified polyethylene glycols. Other examples of water-solubilizing groups are amide or urea group-containing polyols such as are described above.

The partially reacted NCO-containing polymer may contain both anionic and cationic groups. Preferably, the anionic groups will predominate. Both anionic and cationic groups may be introduced into the polymer chain by using reactants which have both anionic and cationic groups (Zwitterions). Examples of such reactants would be hydroxy-containing ethylene diamine, derivatives of acetic acid such as

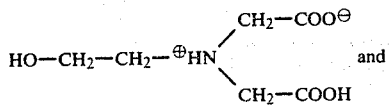 and

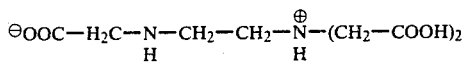

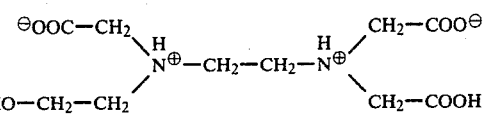

Also, aromatic Zwitterions such as

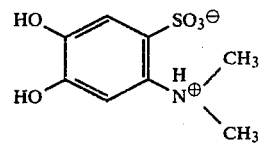

could be employed. One advantage of having both anionic and cationic groups in the polymer molecule is that they can cooperate with one another to form a chleating resin for complexing metal ions. As mentioned above, the anionic group should predominate and this can be achieved by selection of the appropriate reactants and controlling the pH of the dispersion. By predominate is meant that the anionic groups constitute at least 60 mole percent of the ionic groups.

The NCO-containing polymer (prepolymer) can be prepared by techniques well known in the art. For example, the polyisocyanate is usually first charged to a suitable reaction vessel, followed by the active hydrogen component, and the mixture may then be heated if necessary until isocyanate has completely reacted with the active hydrogens to produce an NCO-containing prepolymer being essentially free of active hydrogens as determined by the product having an essentially constant NCO equivalent. If desired, catalyst such as dibutyltin dilaurate, stannous octoate and the like can be employed to accelerate the reaction. Reaction can take from several minutes to several days, depending on the reactivity of the reactants, temperature, presence or absence of catalyst, and the like.

Usually a solvent is employed to facilitate reaction and control of the viscosity of the prepolymer. The viscosity of the prepolymer is extremely important in obtaining a stable dispersion with a finely particulated dispersed phase. The viscosity of the prepolymer can be reduced by heating the neat polymer melt or by dissolving the polymer in a suitable solvent. Dissolution of the NCO-containing polymer in organic solvent is preferred because it is an easier way to control polymer viscosity.

Suitable solvents for the prepolymer are those which are unreactive towards NCO groups. Such solvents are organic solvents such as ketones, tertiary alcohols, ethers, esters, hydrocarbons and chlorocarbons. Suitable solvents for the final polymer product which are reactive towards NCO groups may be added right before the prepolymer is dispersed, during dispersion or after dispersion. The solvents for the final polymer product should be water-soluble if they are added after dispersion, and examples include ketones and alcohols. Water-insoluble materials such as chloro-carbons or hydrocarbons should not be added to the resin after it it dispersed.

For air drying systems, or the low temperature bake systems, a high boiling solvent, that is, one which boils above 125° C., is preferably used at least in part to provide film coalescence, although low boiling solvents, that is, those boiling below 100° C., may be used with such systems for processing advantages such as rapid drying. With high temperature baking systems, the temperature itself is sufficient to provide film coalescence and high boiling solvents are often not necessary, although, of course, they can be used along with low boiling solvents for processing advantages such as stabilizing the dispersion.

When a solvent is employed, it should be present in an amount sufficient to reduce the viscosity of the prepolymer to the required level, at a moderate temperature, i.e., up to 150° C., to effect adequate dispersion, and yet preferably not be present in an amount so great that subsequent removal of the solvent would be needed. Generally, the solvent should be used in an amount of up to 60 percent, and preferably about 3 to 40 percent by weight, based on total weight of the solvent and NCO-containing prepolymer.

The organic polyisocyanate is employed in an amount sufficient to react with the desired amount of the active hydrogen-containing components so as to produce an NCO-containing prepolymer. The equivalent ratio of organic polyisocyanate to active hydrogen-containing compound should be at least 4:3 and is usually within the range of about 7 to 1.5:1, preferably within the range of 6 to 1.8:1. To make a high molecular weight thermoplastic material, i.e., 10,000 or more, reaction should be complete so that substantially all the active hydrogen material is used up, and the resulting NCO-polymer is substantially free of highly active hydrogen. By the expression "substantially free of active hydrogen" is meant the resultant NCO-polymer is substantially free of active hydrogen associated with materials charged to the reaction mixture for the purpose of reacting with isocyanates to form urethanes, thiourethanes and ureas, that is, —OH, SH, =NH$_2$. Not included within the expression highly active hydrogen are the urethane, thiourethane and urea hydrogens formed in the NCO-polymer forming reaction, or any hydrogens associated with salt formation (e.g., acid groups). The determination that the product is substantially free of highly active hydrogen is made when reaction is complete and the fully reacted product has an essentially constant NCO equivalent.

For high molecular weight thermoplastic prepolymers, the use of all low molecular weight active hydrogen-containing compounds is often undesirable if non-crystalline polymers are desired. Thus, some high molecular weight active hydrogen compound should be included in the prepolymer in order to make non-crystalline coatings. With low molecular weight prepolymers, such control on the active hydrogen-containing compound is not necessary.

For elastomeric coatings, a high molecular weight polyester or a polyether polyol should be present in the prepolymer formulation and constitute at least 20 percent by weight of the prepolymer based on total weight of the prepolymer reactants. Preferably, about 25 to 80 percent by weight of the polymeric polyol should be employed in order to get optimum elastomeric properties.

To obtain somewhat harder elastomeric coatings, the prepolymer formulation can be varied by the incorporation of a low molecular weight active hydrogen-containing compound such as a polyol into the formulation. In general, the low molecular weight, active hydrogen-containing compound will be present in amounts up to 50 percent by weight of the prepolymer, preferably about 2 to 35 percent by weight based on total weight of the prepolymer reactants. When the low molecular weight, active hydrogen-containing compound is needed for water solubility, such as is the case with prepolymers containing non-ionic water solubilizing groups, higher percentage of the low molecular weight, active hydrogen-containing compounds should be employed, that is, from about 2 to 35 percent by weight based on total weight of the prepolymer reactants.

In the case where drying or semi-drying oil is incorporated into the composition, the amount used will depend once again on many factors such as the degree of flexibility desired in the final coating and the nature of the other reactants, as well as the degree and rate of air curing. In general, the drying oil should be used in amounts up to 50 percent by weight, usually about 5 to 40 percent by weight based on total weight of the prepolymer reactants where an air drying coating composition is desired. We have found that because of their hydrophobicity, oil-containing polyurethanes may sometimes require a somewhat higher percentage of acid salt groups than comparable polyurethanes free of such oils.

The amount of salt groups contained in the polymer depend on the product desired, the amount of other solubilizing groups present, the molecular weight of the product, as well as the hydrophobic groups present.

The percentage of salt groups in the prepolymer can be expressed as the salt group equivalent weight which is defined as the weight per salt group and which can be determined by dividing the weight of the prepolymer in grams by the number of salt groups present in the prepolymer. The salt group equivalent weight of the prepolymer should broadly be 6000 or less, preferably 200 to 5000 in order to form stable dispersions. High proportions of salt groups or lower salt equivalent weights than that specified in the above-mentioned range are not recommended because the resulting polymers are too soluble, forming viscous, hard-to-handle dispersions or solutions. Lower proportions of salt groups or higher salt equivalent weights than that specified in the above-mentioned broad range are also not recommended because the resultant prepolymer will have poor water dilutability. Such prepolymers form coarse, sedimenting dispersions which cannot easily be used to form stable smooth uniform coating compositions.

The salt equivalent weight can be controlled by controlling the amount of salt-forming groups which are incorporated into the polymer and/or controlling the degree of salt formation of the polymer which contains salt-forming groups. Either method of controlling the salt equivalent weight has been found to be satisfactory.

It should be mentioned at this point the importance in salt formation of controlling the valency of the counter ion formed. The counter ion is the ionic group not covalently bound to the polymer which results from the formation of ionic groups in the NCO-containing polymer. For example, when a sulfonic acid-containing prepolymer is neutralized with a diamine, a diamine counter ion results. Since the counter ion is a divalent, it can crosslink polymer chains resulting in gelling of the resin, provided, of course the pH of the dispersion is suitable. Therefore, salt formers having essentially monovalent counter ions should be employed. A monovalent counter ion for the purposes of this invention is one which exhibits a valency of one towards the polymer in the dispersion. Such counter ions can be actually monovalent species such as monoamine cation. Under certain circumstances, potentially polyvalent counter ions can also be monovalent towards the polymer in aqueous dispersion. Examples of potentially polyvalent counter ions which behave as monovalent counter ions towards the polymer are materials such as ethylene diamine which has the potential of being a divalent counter ion because of the two amine groups. However, when it is used to neutralize a carboxylic acid-containing prepolymer, it is protonated itself which affects the $pK_a$ of the second amine group, making it more difficult to protonate and requiring a stronger acid than the carboxylic acid groups of the polymer. Thus, ethylene diamine behaves as a monovalent counter ion to the carboxylic acid-containing prepolymer. As mentioned above, with sulfonic acid-containing prepolymers, ethylene diamine would usually behave as a divalent counter ion. Another example of where a normally polyvalent counter ion could be made to behave as a monovalent counter ion is by controlling the pH of the dispersion or by using a large excess of counter ion.

The salt can be incorporated into the prepolymer in the course of the NCO polymer production or at any other suitable time either with or without the presence of solvents. Alternately, salt formation can take place at the time of dispersing the prepolymer in the aqueous medium. With regard to salt forming before dispersion, the salt former such as a tertiary amine can be added to a carboxylic acid-containing neat NCO prepolymer to form the prepolymer salt. However, it is preferred a solvent be employed (i.e., 5 to 60 percent by weight), because adding the salt former to the neat polymer may adversely affect the viscosity of the polymer. Alternately, the salt can be first formed and then reacted to form the prepolymer. An example would be where the amine salt of dimethylol propionic acid was first prepared and then reacted with a polyisocyanate for form NCO-containing prepolymer. However, as has been mentioned above, it is preferred that the salt formation take place upon dispersion of the prepolymer. In some cases, by delaying salt formation until the dispersion stage, one is better able to control the viscosity of the prepolymer and thus better able to obtain a finely dispersed, stable dispersion.

To form a finely divided, stable dispersion, the NCO-containing prepolymer should be within the viscosity range of 50 to 10,000, and preferably from 100 to 5000 centipoises. Polymers within this viscosity range are easy to disperse, requiring only mild agitation. Polymers with viscosities higher than 10,000 centipoises are difficult to disperse even with high shear agitation equipment because large or very coarse dispersions are formed which are usually coarse and sedimenting.

The amount of aqueous medium employed in the formulations of the dispersions of the present invention is important. When too little amount of aqueous medium is employed, mixtures are obtained which are often too thick to handle easily while, on the other hand, dispersions which are too dilute are uneconomical to handle due to their excessive volume. In general, the aqueous medium will amount to 15 to 80 percent by weight, preferably about 20 to 70 percent by weight, based on total weight of the polymer and the aqueous medium. Water is a necessary ingredient of the aqueous medium, being present in an amount of at least 30 and preferably at least 45 percent by weight based on total weight of the aqueous medium with a cosolvent constituting the remainder of the medium.

The term "dispersion" as used within the context of the present invention, is believed to be a two-phase, translucent, aqueous polyurethane system in which the polyurethane is the dispersed or continuous phase. In most instances, the polyurethane is dispersed and when thinned with water to form a one percent solids dispersion, the average particle size diameter is less than 10 and preferably less than 5, and most preferably 1 micron or less as determined by light transmission. The particles may be spherical or elongated or invisible by microscopic investigation. The dispersions are generally only stable if the particle size does not exceed 5 microns. Small particle size dispersions are advantageous because they are non-sedimenting and have a high surface energy associated with them. This results in a strong driving force for coalescing and in coatings having surprisingly fast drying times. The term "dispersion" is also intended to cover homogeneous aqueous solutions which appear optically clear.

It should be pointed out at this point in the specification that where the term "polyurethane" has been used in the specification and claims, it is intended to cover not only polycondensates of polyisocyanates and polyols, but also the condensates of polyisocyanates with any active hydrogen-containing material mentioned above. Thus, the term "polyurethane" is defined as any polymer containing two or more urethane groups and is also intended to cover polyureas and polythiourethanes.

The NCO-containing polymer can be dispersed in a number of ways. Preferably, the prepolymer, whether neat or as a solution, is added incrementally to the aqueous dispersing medium with agitation. Alternately, the aqueous dispersing medium can be added incrementally to the prepolymer with stirring. However, this latter method is less preferred because commonly upon initial addition of the dispersing medium, a high viscosity, grease-like material results. The main disadvantage associated with this grease-like viscosity is that it is very hard to stir in more water. Without efficient stirring, there is a definite possibility of forming gel particles. By adding the prepolymer to water, this high initial viscosity is avoided.

After the NCO-polymer has been prepared, additional solvent can be added before dispersion or, for that matter, after the prepolymer has been dispersed in the aqueous medium so as to control the viscosity of the prepolymer and particle size of the dispersed phase or enhance film coalescence and overall coating properties. The solvents can be selected from those mentioned above. Use of low molecular weight hydrophilic solvents such as lower alkyl alcohols (stearically hindered so as not to react with NCO) will sometimes increase the viscosity of the final polymer product acting as a thickening agent. The use of hydrophobic solvents such as toluene, benzene and xylene will give coarser dispersions. A hydrophilic solvent can be added to the prepolymer at any time in the process, although the effect it renders on the viscosity may be different. A hydrophobic solvent should be added to the prepolymer before dispersion, otherwise a two-layered product forms.

As has been mentioned above, because of viscosity and dispersion stability considerations, it is preferred that the NCO-containing prepolymer be added to the aqueous medium which contains a salt former.

Usually after the salt form of the prepolymer has been dispersed, a chain extender is added to the dispersion fairly quickly. The prepolymer reacts with water at a slow rate depending upon the reaction mixture. The time after the prepolymer has been added to water and before chain extender is added will determine how much of the water reacts with the prepolymer. The temperature of the dispersion will also play an effect in how much reaction occurs. Change in temperature and time will result in different products. In order to get reproducible results, the time, temperature and amount of chain extender should be rigidly controlled. The time and temperature is important to determine what type of final product is desired. Chain extenders build molecular weight of the dispersed prepolymer, whereas chain terminators react with the NCO groups and prevent them from further reacting with water and gelling the resultant resin. For purposes of this invention, the term "chain extender" is meant to cover both chain extenders which build molecular weight and also chain terminators. The chain extender can be defined as an active hydrogen-containing compound having at least one hydrogen more reactive with NCO groups than water. Examples of suitable classes of chain extenders are ammonia, primary and secondary organic amines, preferably diamines, hydrazine, substituted hydrazines and hydrazine reaction products and certain organic polyols. The chain extenders are preferably water-soluble, although water-dispersible materials may be used. Water-soluble chain extenders are preferred, because if the prepolymer is only marginally dispersible, a water-soluble chain extender will enhance the water dispersibility of the final polymer product. Organic diamines are often the preferred chain extenders because they usually build the highest molecular weight without gelling the resin.

Special note should be made of chain extenders which also introduce functional groups into the final polymer structure so as to make the final polymer further reactive with materials such as curing agents or the like. Examples of such chain extenders would be alkanol amines such as N-aminoethylethanolamine, ethanolamine, diethanolamine, aminopropyl alcohol, 2,2-dimethyl-3-ol-propenylamine, 3-aminocyclohexyl alcohol, para-aminobenzyl alcohol and the like. Materials of this type introduce hydroxyl functionality into the final polymer product. Examples of other materials which would introduce functionality into the final polymer product would be carboxylic acid-containing amines such as lysine or lysine hydrochloride glutamic acid, glycine, alanine, reaction product of ethylene diamine and acrylic acid which would introduce carboxyl fucntionality into the final polymer product. Use of carboxyl-containing chain extenders can also be used in instances where acid salt-containing prepolymer is only marginally dispersible. In this instance, the carboxyl-containing amine chain extender could be neutralized and when used to chain extend the prepolymer, would enhance the dispersibility of the final polymer product.

Examples of suitable chain extenders other than those mentioned specifically above are the following: ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4'-methylene-bis(2-chloroaniline), 3,3-dichloro-4,4'-biphenyl diamine, 2,6-diaminopyridine, 4,4'-diamino diphenylmethane, and adducts of diethylene triamine with acrylate or its hydrolyzed products. Also materials such as hydrazine, substituted hydrazines such as, for example, dimethyl hydrazine, 1,6-hexamethylene-bis-hydrazine, carbodihydrazide, hydrazides of dicarboxylic acids and sulfonic acids such as adipic acid mono- or dihydrazide, oxalic acid dihydrazide, isophthalic acid dihydrazide, tartaric acid dihydrazide, 1,3-phenylene disulfonic acid dihydrazide, omega-amino-capronic acid dihydrazide, hydrazides made by reacting lactones with hydrazine such as gamma-hydroxybutyric hydrazide, bis-semi-carbazide, bis-hydrazide carbonic esters of glycols such as any of the glycols mentioned above.

Also materials such as hydroxyl-containing materials such as hydroxyl-containing polyesters and alkyds may be employed.

The final chain extended polymer dispersed in water should have a viscosity of about 10 to 50,000, and preferably from about 20 to 20,000 centipoises in order to be easily handled and should have a solids content of about 20 to 80 percent. As mentioned earlier, dispersion should be stable and can be essentially emulsifier free. The particle size of the dispersed phase when measured as described above at one percent solids is less than 10, preferably less than 5, and most preferably 1 micron or less, and the particles may be spherical or elongated. Further, the dispersed, chain extended resin should be non-gelled, having an intrinsic viscosity of less than 4.0, preferably less than 2.0, and most preferably from about 0.1 to 1.5 deciliters per gram; the intrinsic viscosity being determined as described above.

Crosslinking or curing agents may be added to the dispersion, these agents bringing about chemical crosslinking after a film is deposited either at room temperature or elevated temperature, depending upon the coating system. Examples of suitable curing agents would be aminoplast resins, formaldehyde, phenolic resins, alkoxysilanes, organic polyisocyanates which include free, as well as masked and blocked isocyanates, and epoxy-containing organic materials. Water-soluble crosslinking agents such as the amino-plast, formaldehyde and phenolics are simply added to the finished dispersion, whereas more hydrophobic materials such as some organic isocyanates and some epoxy-containing organic materials are preferably dissolved or emulsified in a solvent which is compatible with water. They should be compatible with the aqueous polyurethane without separating into two layers when mixed.

The aminoplast, phenol-formaldehyde and isocyanate curing agents are employed to cure products containing free hydroxyl or amine groups. Suitable aminoplast, phenolic and isocyanate curing agents are described in U.S. Pat. application Ser. No. 392,585 to Chang et al, page 9, line 19, to page 11, line 11, which is hereby incorporated by reference.

Examples of other curing agents are organic epoxy materials. The epoxies can be used as curing agents to cure products containing free amino groups or carboxylic acid groups. Epoxy compounds can be any monomeric or polymeric compound or mixture of compounds having a 1,2-epoxy equivalency greater than 1, that is, in which the average number of 1,2-epoxy groups per molecule is greater than 1. Useful class of polyepoxides is polyglycidyl ethers of polyphenols such as Bisphenol A, or polyols such as butanediol.

The curing agents described above are examples of external curing agents which form one component of a two-component system with the chain extended polymer forming the other component. These two-component systems come in the form of one or two-package systems depending on the reactivity of the curing agent at room temperature. For example, aminoplast curing agents which are usually unreactive at room temperature may be blended with the polyurethane disersion of the invention to form stable one-package systems. On the other hand, some epoxy curing agents and all free NCO-type curing agents, because of their high reactivity at room temperature, must be used with the polyurethane dispersions of the invention in a two-package system.

Besides two-component systems, a one-component system in which the curing agent is part of the chain extended polymer can also be employed. Internal curing agents can be incorporated into the polymer molecule either in the prepolymer preparation or chain extension stages by the use of active hydrogen-containing materials which also contain groups capable of curing the resin. Usually these groups are latent curing agents and are activated by heat, UV light, electron beam radiation, microwave radiation and the like. Coatings prepared from the aqueous dispersions of the present invention are particularly suited for microwave radiation curing, since both water and the polar nature of the polymer increase the efficiency in absorbing the incident radiation. This has proven especially effective in curing these coatings with a non-absorbing transparent substrate such as when the coatings are applied on glass bottles.

Examples of other systems capable of internal curing would be chain extended polyurethanes of the present invention containing N-alkoxymethyl moieties or blocked isocyanate moieties. Examples of such products would be chain extended polyurethanes of the present invention prepared with hydroxy-containing acrylic polymers made in part from N-alkoxymethyl acrylamides and/or ethylenically unsaturated blocked isocyanates. Such interpolymers are described in the aforementioned Chang application, U.S. Ser. No. 392,585, filed Aug. 29, 1973, on pages 5 and 6, the portions of which are hereby incorporated by reference. Other examples include the reaction product of diethanolamine, urea, formaldehyde and an alcohol, that is,

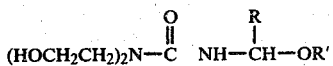

wherein R and R' are hydrogen or lower alkyl containing from 1 to 5 carbon atoms.

Also, active hydrogen-containing masked isocyanates such as aminimides, that is,

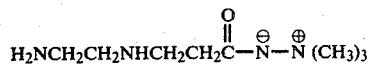

and active hydrogen-containing blocked isocyanates such as

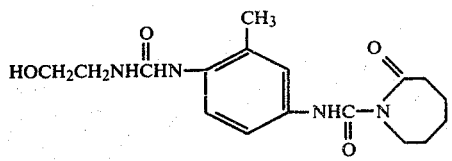

as well as active hydrogen-containing alkoxysilanes such as N-(2-aminoethyl)-3-aminopropyltriethoxysilane can also be employed.

The chain extended polyurethanes containing pendent or internal ethylenically unsaturated groups can be cured by exposure to UV radiation and/or reaction with free radical initiators, for example, benzoyl peroxide. Examples of pendent ethylenically unsaturated groups include acrylates, methacrylates and allyl compounds. These are usually incorporated into the polymer by reaction of NCO reactive groups, for example, N-tertbutylaminoethyl methacrylate, hydroxyethyl acrylate and diallyl amine. Examples of internal ethylenically unsaturated groups would include polyester polyols in which maleic anhydride is part or all of the acid moiety. These types of materials can be cured by microwave radiation and heat. Also, infrared or microwave radiation can be used to remove water and then ultraviolet or electron beam radiation used to cure. Curing can be accomplished with or without the presence of other vinyl monomers such as hydroxyethyl acrylate or ethylene glycol diacrylate with or without the presence of polymercaptans such as dithioethylene glycol.

Internal curing may also occur as the result of removal of a stabilizing ingredient. For example, polyvalent metal ions can be stabilized by the addition of volatile complexing agents. When the coating is applied, these agents evapoate, allowing the metal to bond at two or more sites on the polymer resulting in a crosslinked coating. An example of this would be the use of zinc or zirconium salts which are stabilized by the addition of excess ammonia. When a coating is applied, the ammonia evaporates resulting in a tough, crosslinked coating.

This same principle can be used to inactive catalyst to achieve one-package stability. For example, toluene sulfonic acid which is used to catalyze curing with urea-formaldehyde resins can be inactivated with a volatile amine. When the coating is applied, the amine-acid complex is decomposed through volatilization of amine and the coating is cured.

It should be clear from the above that combinations of the various described internal curing agents or combinations of internal and external curing agents can be used to develop optimum crosslinked coatings. An example would be the use of internally contained blocked isocyanates and externally used melamine-formaldehyde resins to develop a coating of optimum hardness.

The amount of curing agent used would depend primarily on the final properties desired in the cured polymer film. In general, at least about one percent and preferably about 5 to 75 percent by weight of a curing agent or agents should be used, the percentage by weight being based on total weight of the polymer and curing agent.

Curing conditions can vary widely depending primarily on the curing agent used as well as the particular components of the composition. For heat curing, catalyst can be used to permit cure at lower temperatures and for shorter periods of time. In general, the cure schedule can be from as short as one minute to as long as several hours and from temperatures such as room temperature or 23° C. to elevated temperatures as high as 300° C.

In addition to the components mentioned above, the compositions ordinarily contain optional ingredients, including any of the various pigments ordinarily utilized in coatings. In addition, various fillers, plasticizers, antioxidants, flow control agents, surfactants and other such formulating additives can be employed. Although the products of the invention can be dispersed without the aid of conventional surfactants or emulsifying agents, it may be desirable in certain instances to add a surfactant or emulsifying agent to the dispersion for the purpose of effecting the final properties of the coating composition, for example, when an easily releasable coating is needed. For example, it has been found that the dispersions of the present invention are particularly useful as forming a plastic coating over returnable beverage bottles. When the bottle is dropped and broken, the plastic coating retains the glass and prevents it from shattering over a great distance. To be successful in this application, the coating should have a reduced degree of adhesion to the bottle so that it may act as a diaphragm and absorb the energy released from the breaking bottle. It has been found that the presence of minor amounts of surfactant in the dispersion sufficiently effect the adhesion of the resultant coating to the glass to result in a superior bottle coating.

In addition to the components mentioned above, the compositions ordinarily contain optional ingredients, including any of the various pigments ordinarily utilized in coatings of this general class. In addition, various fillers, plasticizers, anti-oxidants, flow control agents, surfactants, and other such formulating additives can be employed in many instances.

The compositions herein can be applied by any conventional method, including brushing, dipping, flow coating, electrodeposition, electrostatic spraying, and the like, but they are most often applied by air spraying. The usual spray techniques and equipment are utilized. The coatings of the present invention can be applied over virtually any substrate, including wood, metals, glass, cloth, plastics, foam and the like, as well as over various primers. The compositions disclosed herein can be added to other water-compatible compositions to improve flexibility, hardness, drying and other coating properties.

EXAMPLE I

A poly(urethane-urea) lacquer was prepared as follows: A polyester diol, poly(epsilon-caprolactone), made from ring opening epsilon-caprolactone with dimethylol propionic acid was prepared as follows: 1206 parts by weight of dimethylol propionic acid and 10,260 parts by weight of epsilon-caprolactone were charged to a suitable reaction vessel. The mixture was heated and the temperature was initially permitted to increase to 160° C. over a period of 40 minutes, after which time the reaction mixture was cooled to prevent any further increase in temperature. The temperature was maintained between 158-160° C. for an additional two hours. The resulting poly(epsilon-caprolactone) diol had an acid value of 41.9 and an OH value of 87.5.

The poly(epsilon-caprolactone) diol was then reacted with neopentyl glycol and 4,4'-methylene-bis(cyclohexyl isocyanate), commercially available form E. I. duPont de Nemours as HYLENE W, to form an NCO-containing prepolymer as follows: 1025 parts by weight of the poly(epsilon-caprolactone) diol prepared as described above was charged to a suitable reaction vessel along with 21 parts by weight of neopentyl glycol, 346 parts by weight of HYLENE W, and 7 parts by weight of dibutyltin dilaurate urethane forming catalyst, and 344 parts by weight of N-methyl pyrrolidone solvent. The reaction mixture was heated to 83° C. under a nitrogen atmosphere over a 4½ hour period. The reaction mixture was then cooled to room temperature. The resulting product had an NCO equivalent of 2090 and contained 80.9 percent by weight total solids.

The carboxylic acid-containing, NCO-containing polymer prepared as described immediately above was first neutralized, then dispersed in water and subsequently chain extended as follows: 6.7 parts by weight of triethylene diamine was added to 105 parts by weight of the prepolymer with stirring to neutralize the carboxylic acid groups (100 percent of theoretical neutralization). Then, 115 parts by weight of deionized water was added slowly with stirring to disperse the neutralized prepolymer. The dispersion was very viscous. Four and 1/5 (4.2) parts by weight of 1,8-menthane diamine, a water-dispersible chain extender, was then slowly added to the reaction mixture, followed by the addition of another 140 parts by weight of deionized water to thin the reaction mixture.

The resultant chain extended poly(urethane-urea) resin was a non-gelled product as evidenced by its solubility in hot (50° C.) N-methyl pyrrolidone. The resin was essentially free of NCO groups as determined by an infrared scan; and in the aqueous phase a thixotropic dispersion.

EXAMPLE II

A poly(urethane-urea) lacquer was prepared as generally described above in Example I with the exception that 1.45 parts by weight of an 85 percent aqueous solution of hydrazine hydrate, a water-soluble chain extender, was used rather than the 1,8-menthane diamine. The resultant poly(urethane-urea) was non-gelled and essentially free of unreacted NCO groups as determined by an infrared scan. The product was a thixotropic dispersion.

EXAMPLE III

In a manner similar to Example I, an aqueous dispersion of a polyurethane lacquer was prepared with the exception that a 1000 molecular weight poly(1,4-butanediol adipate) was used as the polyester diol instead of the poly(epsilon-caprolactone) diol. The charge for making the partially reacted NCO-containing polymer was as follows:

| Charge | Parts by Weight |
| --- | --- |
| poly(1,4-butanediol adipate) | 700 |
| dimethylol propionic acid | 47 |
| neopentyl glycol | 15 |
| HYLENE W | 550 |
| dibutyltin dilaurate, catalyst | 0.7 |
| N-methyl pyrrolidone, solvent | 329 |

The resultant NCO-containing prepolymer was 80.3 percent by weight total solids and had an NCO equivalent of 1050.

The carboxylic acid-containing, NCO-containing polymer was neutralized, dispersed and chain extended as described in Example I, that is, 105 parts by weight of the prepolymer was neutralized with 5.0 parts by weight of triethylene diamine (100 percent of theoretical neutralization) and the neutralized product dispersed in 85 parts by weight of deionized water. The dispersed prepolymer was chain extended with 8.25 parts by weight of 1,8-menthane diamine to form a non-gelled poly(urethane-urea) essentially free of NCO groups. The resin was well dispersed in water forming a stable thixotropic dispersion.

EXAMPLE IV

A poly(urethane-urea) lacquer was prepared as generally described in Example III above with the exception that 2.9 parts by weight of an 85 percent aqueous solution of hydrazine hydrate was employed as a chain extender rather than 1,8-menthane diamine. The resulting poly(urethane-urea) was non-gelled, essentially free of unreacted NCO and produced a stable thixotropic dispersion.

EXAMPLE V

In a manner similar to Example III above, an aqueous dispersion of a poly(urethane-urea) lacquer was prepared. The charge for making the NCO-containing polymer was as follows:

| Charge | Parts by Weight |
| --- | --- |
| poly(1,4-butanediol adipate) | 300 |
| dimethylol propionic acid | 40 |
| neopentyl glycol | 25 |
| HYLENE W | 315 |
| dibutyltin dilaurate, catalyst | 0.3 |
| N-methyl pyrrolidone, solvent | 292 |

The prepolymer solution contained 69.3 percent by weight total solids and had an NCO equivalent of 1380.

The carboxylic acid-containing partially reacted NCO-containing polymer was neutralized, dispersed and chain extended as generally described in Example III with the exception that only about 80 percent of the total theoretical neutralization was achieved as compared to the 100 percent total theoretical neutralization of Example III. This partial neutralization was accomplished by neutralizing 94.5 parts by weight of the NCO-containing prepolymer (COOH equivalent 3240) with 2.6 parts by weight of triethylene diamine. The neutralized product was dispersed by adding 85 parts by weight of water, the prepolymer being very fluid with moderate cloudiness. The dispersed prepolymer was chain extended by adding 5.9 parts by weight of 1,8-menthane diamine dropwise over a three-minute period. The resulting poly(urethane-urea) was non-gelled, essentially free of unreacted NCO, producing an off-white stable dispersion of high viscosity but readily flowable.

EXAMPLE VI

A poly(urethane-urea) lacquer was prepared as generally described in Example V with the exception that the acid-containing NCO-containing prepolymer was neutralized to 100 percent of theoretical neutralization equivalent with triethylene diamine and hydrazine was used as the chain extender. The procedure for neutralizing and chain extending was as follows: 94.5 parts by weight of the prepolymer was charged to a flask and heated to 60° C.; 3.3 parts by weight of triethylene diamine was added to the heated prepolymer to neutralize it (100 percent of theoretical); 174 parts by weight of deionized water was then added to the neutralized prepolymer to disperse it, after which 2.06 parts by weight of hydrazine hydrate was added to the dispersed prepolymer to chain extend it. The resultant poly(urethane-urea) was non-gelled, essentially free of unreacted NCO groups and produced a slightly cloudy stable dispersion which was very fluid. The resin dispersion contained 25 percent total solids and has a Brookfield viscosity of 35 centipoises at 100 rpm's.

EXAMPLE VII

A poly(urethane-urea) lacquer was prepared as generally described in Example VI with the exception that a higher total solids content dispersion was prepared by using less water. The charge used to prepare the resultant poly(urethane-urea) was as follows:

| Charge | Parts by Weight |
| --- | --- |
| NCO prepolymer (COOH equivalent equals 3240) | 660 |
| triethylene diamine | 229 |
| deionized water | 730 |
| hydrazine hydrate | 14.4 |

The resulting poly(urethane-urea) dispersion was filtered and very little material filtered out. The dispersion was stable and had a solids content of 31.9 percent and a Brookfield viscosity of 100 centipoises at 100 rpm's.

EXAMPLE VIII

A poly(urethane-urea) lacquer was prepared as generally described in Example VI with the exception that the dispersion was achieved by adding the acid-containing, NCO-containing prepolymer to a water-amine solution to subsequently neutralize the dispersed prepolymer rather than adding water to the amine acid salt of the prepolymer as described in working Example VI. The procedure for dispersion was as follows: To a suitable flask was charged 66.2 parts by weight of triethylene diamine and 2130 parts by weight of deionized water. The charge was stirred to form a solution. To this amine solution was charged 1870 parts by weight of the acid-containing, NCO-containing prepolymer solution of Example VI to neutralize (100 percent theoretical neutralization) and disperse the prepolymer. The prepolymer was at a temperature of 90° C. and the amine solution was at a temperature of 24° C. Addition was complete after 5 minutes and during addition, the prepolymer remained very fluid in the amine-water mixture. To the neutralized, dispersed prepolymer was added a mixture of 42.3 parts by weight of an 85 percent aqueous solution of hydrazine hydrate (chain extender) and 42 parts by weight of deionized water. At the beginning of addition, the temperature of the dispersed, neutralized prepolymer was 45° C. and after addition of the chain extender, the temperature was 53° C. Addition was complete in about 5 minutes. The reaction mixture was then cooled and filtered through a coarse filter and no resin particles filtered off. The resulting poly(urethane-urea) dispersion was stable and contained a total solids content of 33.6 and had a Brookfield viscosity of 102 centipoises at 100 rpm's. The poly(urethane-urea) resin was non-gelled and essentially free of unreacted NCO groups. The poly(urethane-urea) dispersion was then deposited as a film on a polypropylene sheet by drawing down with a 3-mil draw bar. The coatings were cured for 20 minutes at 104° C. The coatings had a tensile strength of 6000 pounds per square inch and an ultimate elongation of 380 percent.

EXAMPLE IX

A poly(urethane-urea) lacquer was prepared as generally described in Example VIII with the exception that the acid-containing. NCO-containing prepolymer was neutralized (100 percent of theoretical neutralization) with a mixture of triethylene diamine and triethyl amine, the latter a relatively volatile amine; the theory being that a volatile neutralizer would improve the humidity resistance of the film because it would volatilize off during baking of the resultant coating. The procedure for neutralizing, dispersing and chain extending was as follows: 4.66 parts by weight of triethylene diamine, 4.2 parts by weight of triethyl amine and 280 parts by weight of deionized water were added to a reaction flask and stirred to form a solution to which was added 260 parts by weight of the acid-containing, NCO-containing prepolymer of Example VIII at 50° C. The resultant neutralized prepolymer was well dispersed and of low viscosity. To the neutralized prepolymer was added a mixture of 5.9 parts by weight of an 85 percent aqueous solution of hydrazine hydrate and 6 parts by weight of deionized water. The resultant chain extended poly(urethane-urea) dispersion was stable and contained 33.5 percent by weight total solids and had a Brookfield viscosity of 98 centipoises at 100 rpm's. The poly(urethane-urea) dispersion was non-gelled and essentially free of unreacted NCO groups.

EXAMPLE X

A poly(urethane-urea) lacquer was prepared as generally described in Example V with the exception that t-butyl alcohol was added to the neutralized dispersion to aid in coalescence. The procedure was accomplished as follows: 118 parts by weight of the acid-containing, NCO-containing prepolymer of Example V were charged to a reaction vessel and heated to 55° C. To this heated mixture was added 3.7 parts by weight of triethylene diamine to disperse and neutralize the prepolymer (80 percent total theoretical neutralization). To the neutralized dispersion was added a mixture of 93.5 parts by weight of deionized water and 6.6 parts by weight of t-butyl alcohol. Addition was complete after four minutes and the reaction mixture temperature was now at 43° C. The viscosity increased considerably after the addition of the t-butyl alcohol and water. To the thickened neutralized dispersion was added a mixture of 2.9 parts by weight of an 85 percent by weight aqueous solution of hydrazine hydrate and 3.0 parts by weight of deionized water. Addition was complete after two minutes and the reaction mixture was permitted to increase in temperature to 60° C. An additional 58 parts by weight of deionized water was added to the resultant poly(urethane-urea) to further reduce the viscosity. The dispersion was stable, had a total solids content of 33 percent by weight and a viscosity of 125 centipoises at 100 rpm's. The poly(urethane-urea) resin was non-gelled and essentially free of unreacted NCO groups.

EXAMPLE XI

A poly(urethane-urea) lacquer was prepared as generally described in Example VIII with the exception that lysine hydrochloride was used as the chain extender instead of hydrazine. The procedure for making the lacquer was as follows: To an aqueous solution containing 295 parts by weight of deionized water and 10.4 parts by weight of triethylene diamine was added 260 parts by weight of the acid-containing, NCO-containing prepolymer described in Example VIII. The prepolymer was at a temperature of 50° C. and was added to the amine solution at a temperature of 25° C. Addition was complete in about three minutes, resulting in a clear neutralized (100 percent of theoretical) prepolymer dispersion. The reaction mixture was heated to 46° C. in about 10 minutes, heating was discontinued and a mixture of 91 parts by weight of lysine hydrochloride and 260 parts by weight of deionized water was added to the mixture. Addition was complete in about five minutes. The resultant chain extended poly(urethane-urea) dispersion was slightly cloudy. The pH of the dispersion was 6.9. An additional 5.7 grams of triethylene diamine was added to the dispersion to raise the pH to 8.0 The dispersion was stable and had a total solids content of 31.9 and a Brookfield viscosity of 44 centipoises at 100 rpm's. The chain extended resin was non-gelled and essentially free of unreacted NCO groups.

EXAMPLE XII

A poly(urethane-urea) lacquer similar to Example I was prepared with the exception that no neopentyl glycol was used. The charge for preparing the NCO-containing, acid-containing prepolymer was as follows:

| Charge | Parts by Weight |
|---|---|
| poly(epsilon-caprolactone) diol | 1030 |
| HYLENE W | 308 |
| methyl ethyl ketone, solvent | 572 |
| dibutyltin dilaurate, catalyst | 7 |

The poly(epsilon-caprolactone) diol was prepared as described in Example I, that is, by ring opening epsilon-caprolactone with dimethylol propionic acid. The poly-(epsilon-caprolactone) diol along with the HYLENE W. dibutyltin dilaurate and methyl ethyl ketone were charged to a suitable reaction vessel and heated 92° C. under a nitrogen atmosphere for a 1½ hour period. The heat was removed and the reaction mixture permitted to stand at room temperature overnight. The reaction mixture was then heated to 85° C. and kept between 85° and 91° C. for a one-hour period. The reaction mixture was then cooled to room temperature and thinned with 238 parts of methyl ethyl ketone. The resultant product had an NCO equivalent of 2500 and contained 70 percent by weight total solids.

The carboxylic acid-containing, NCO-containing polymer was first neutralized, and then dispersed in water and subsequently chain extended as follows: 6.3 parts by weight of triethylene diamine was added to 135 parts by weight of the prepolymer with stirring to neutralize the carboxylic acid groups (100 percent of theoretical neutralization). Then, 115 parts by weight of deionized water was added slowly with stirring to disperse the neutralized prepolymer. The dispersion was very viscous. Four and 1/5 (4.2) parts by weight of 1,8-menthane diamine was then slowly added to the reaction mixture followed by the addition of another 200 parts by weight of deionized water to thin the mixture.

The resultant chain extended poly(urethane-urea) resin was a non-gelled product and essentially free of NCO groups. The resin was moderately soluble in the aqueous phase producing a slightly cloudy, stable dispersion.

EXAMPLE XIII

An acid-containing, NCO-containing partially reacted polymer was prepared from the following charge:

| Charge | Parts by Weight |
|---|---|
| poly(1,4-butanediol) adipate | |

| Charge | Parts by Weight |
|---|---|
| (molecular weight = 1000) | 100 |
| dimethylol propionic acid | 13.4 |
| tris-(hydroxyethyl) isocyanurate | 13.8 |
| HYLENE W | 104.8 |
| dibutyltin dilaurate | 0.12 |
| N-methyl pyrrolidone | 78 |

All the ingredients mentioned above were charged to a glass reaction vessel and placed in an oven at 93° C. for four hours with occasional mixing.

In another reactor, 11.2 parts by weight of triethylene diamine and 369 parts by weight of deionized water were charged and stirred together to dissolve the triethylene diamine.

The partially reacted polymer was removed from the oven and added to the triethylene diamine solution with stirring to neutralize and disperse the polymer. Dispersion was clear and of low viscosity. A mixture of 7 parts by weight of an 85 percent aqueous solution of hydrazine hydrate and 7 grams of deionized water was added dropwise to the neutralized dispersed polymer to chain extend it. The viscosity of the dispersion appeared to decrease and the dispersion became clear. After all the chain extender was added, the dispersion contained 35 percent by weight total solids and had a Brookfield viscosity of 210 centipoises at 100 rpm's. The resin itself was non-gelled and free of unreacted NCO groups. When deposited as films, the poly(urethane-urea) dispersion gave tough, glossy extensible films.

EXAMPLE XIV

An acid-containing, NCO-containing prepolymer as described in Example III was prepared. Eight hundred (800) parts by weight of this prepolymer was then added to a mixture of 30 parts by weight of triethylene diamine, 884 parts by weight of deionized water and 68.4 parts by weight of diethanolamine to neutralize and disperse the prepolymer. The diethanolamine chain terminated the prepolymer and introduced free hydroxyl groups into the polymer which would then be free to react with curing agents.

The resultant dispersion was stable, contained 38.5 parts by weight total solids, had a pH of 8.40 and a Brookfield viscosity of 1080 centipoises at 100 rpm's. The resin was non-gelled and essentially free of NCO and had an acid value of 15.2. The poly(urethane-urea) was blended with 25 percent by weight (total solids) of an aminoplast resin (metholated melamine-formaldehyde condensate) sold commercially by Rohm and Haas as MM83. Coatings deposited from such a blend and cured for 30 minutes at 121° C. were hard, glossy and solvent and impact-resistant.

EXAMPLE XV

An NCO-containing, acid-containing prepolymer such as described in Example III was prepared with the exception that toluene diisocyanate (TDI) was substituted for HYLENE W. The charge was as follows:

| Charge | Parts by Weight |
|---|---|
| poly(1,4-butanediol adipate) | 1400 |
| dimethylol propionic acid | 187.6 |
| neopentyl glycol | 116.5 |
| N-methyl pyrrolidone | 882 |
| toluene diisocyanate (TDI) | 974.4 |

The prepolymer was prepared by slowly adding the TDI to the mixture of the other ingredients in the charge at a temperature of 40° C. and under a nitrogen blanket. Cooling was provided to keep the temperature below 70° C. during addition. After the TDI addition was complete, the reaction mixture was heated to 90° C. and held at this temperature for 2½ hours. The reaction mixture was then cooled to room temperature.

Seventeen hundred eighty (1780) parts of the NCO-containing, acid-containing prepolymer prepared as described above was added at a temperature of 92° C. to 62.4 parts by weight of dimethyl ethanolamine and 1865 parts by weight of deionized water and 50.4 parts by weight of ethylene diamine to disperse, neutralize and chain extend the prepolymer in essentially one operation. The resultant dispersion was very viscous and only slightly cloudy with a few resin particles present. The dispersion was further thinned with 650 parts by weight of deionized water to form a 33.5 percent total solids solution. The dispersion had a pH of 9.5 and a Brookfield viscosity of 200 centipoises at 100 rpm's. When deposited and dried, the resultant poly(urethane-urea) coating was hard and had greater than 300 percent ultimate elongation.

EXAMPLE XVI

An NCO-containing, acid-containing prepolymer was prepared as described in Example III. Two hundred forty-six (246) parts by weight of this prepolymer was brought to a temperature of 85° C. and then charged to a lined paint can containing a mixture of 4.5 parts by weight of ammonium hydroxide (29.8 percent by weight ammonia) sufficient for 95 percent by weight of the total theoretical neutralization, 22.3 parts by weight of deionized water and 5 parts by weight of an 85 percent by weight aqueous solution of hydrazine hydrate. Upon addition of the prepolymer, the viscosity of the mixture increased rapidly. An additional 120 parts by weight of deionized water was added to reduce the viscosity. The resin finely dispersed, had a pH of 7.8 and contained 31 percent by weight total solids. The dispersion was stable and had a Brookfield viscosity of 1520 centipoises at 100 rpm's. The resin was non-gelled and essentially free of unreacted NCO.

EXAMPLE XVII

A poly(urethane-urea) lacquer similar to Example XVI was prepared with the exception that lithium hydroxide was used to neutralize NCO-containing, acid-containing prepolymer. Neutralization was accomplished by heating 126 parts by weight of the prepolymer to 93° C. and charging the prepolymer with mixing to a solution containing 1.4 parts by weight of LiOH . H$_2$O (sufficient for 95 percent of the total theoretical neutralization) dissolved in 140.5 parts by weight of deionized water. The dispersed, neutralized resin was very fluid and clear. The resin was chain extended by adding dropwise 2.9 parts by weight of an 85 percent by weight aqueous solution of hydrazine hydrate and 3.0 parts by weight of deionized water to the dispersed and neutralized prepolymer. The dispersion maintained its fluidity and was practically clear. The dispersion was stable, had a pH of 8.15 and contained 33.3 percent by weight total solids and had a Brookfield viscosity of 680 centipoises at 100 rpm's. The poly(urethane-urea) resin was essentially free of unreacted NCO and was non-gelled. The resin produced highly flexible, tough coatings when applied and dried at room temperature.

EXAMPLE XVIII

An acid-containing, NCO-containing prepolymer was prepared from the following charge:

| Charge | Parts by Weight |
| --- | --- |
| poly(oxytetramethylene) glycol | 98 |
| dimethylol propionic acid | 13.4 |
| neopentyl glycol | 8.3 |
| toluene diisocyanate (TDI) | 69.6 |
| N-methyl pyrrolidone | 64 |

The above reactants were charged to a glass reaction vessel with mixing which produced a very exothermic reaction. The reaction mixture was permitted to stand at room temperature for ½ hour and then placed in an oven at 93° C. for 1½ hours.

A second reactor (a lined paint can) was charged with a solution of 11.2 parts by weight of triethylene diamine dissolved in 232 parts by weight of deionized water and a second solution of 7.05 parts by weight of an 85 percent aqueous solution of hydrazine hydrate and 7 parts by weight of deionized water.

The prepolymer was removed from the oven and charged to the second reactor (containing the triethylene diamine and hydrazine hydrate solution) slowly with stirring. The resin viscosity increased significantly and an additional 100 parts by weight of water was added to thin the viscosity. Eventually, a dispersion was obtained which was stable and clear and contained 33.5 percent by weight total solids. The dispersion had a pH of 8.0 and had a viscosity of 230 centipoises at 100 rpm's. The resin itself was non-gelled and contained essentially no unreacted NCO groups.

EXAMPLE XIX

A solution of 9.3 parts by weight of triethylene diamine dissolved in 255 parts by weight of deionized water was charged to a lined paint can along with a solution of 10.4 parts by weight of N-aminoethyl ethanolamine dissolved in 15.6 parts by weight of deionized water. To this mixture of solutions was added 246 parts by weight of an acid-containing, NCO-containing prepolymer prepared as described in Example III. The resinous prepolymer dispersed but the dispersion rapidly increased in viscosity as more prepolymer was added. To thin the viscosity of the dispersion, 400 parts by weight of deionized water was added. The resultant dispersion was stable, clear and thixotropic. The dispersion had a pH of 9.15, a total solids of 20 percent and a Brookfield viscosity of 16,400 centipoises at 100 rpm's. The resin was non-gelled and essentially free of unreacted NCO.

EXAMPLE XX

A solution of 33.6 parts by weight of triethylene diamine, 25.4 parts by weight of an 85 percent by weight aqueous solution of hydrazine hydrate and 870 parts by weight of deionized water was charged to a lined paint can. Eight hundred eighty-seven (887) parts by weight of an NCO-containing, acid-containing prepolymer prepared as described in Example III was charged to the solution of amines at a temperature of 90° C. The NCO/NH2 (hydrazine) equivalent ratio was 1.0/1.2. The prepolymer readily dispersed and formed a stable, clear dispersion having a pH of 8.25 and containing 39 percent by weight total solids. The dispersion had a viscosity of 342 centipoises at 100 rpm's and the resin itself was non-gelled and essentially free of unreacted NCO.

EXAMPLE XXI

An NCO-containing, acid-containing prepolymer was prepared as described in Example III with the exception that methyl ethyl ketone was used as the solvent instead of N-methyl pyrrolidone. The prepolymer contained 80 percent by weight total solids and had an NCO equivalent of 1050.

The prepolymer at a temperature of 90° C. was added to a solution of 53.4 parts by weight of dimethylethanolamine and 126.5 parts by weight of adipic dihydrazide in 1960 parts by weight of deionized water in a lined paint can. The resin dispersed readily and the viscosity remained low throughout. The dispersion was practically clear. The dispersion was stable, had a total solids content of 35.4 percent and a pH of 7.7 and a Brookfield viscosity of 1750 centipoises at 100 rpm's.

The methyl ethyl ketone was removed from the dispersion by stripping it off under vacuum, followed by adding 50 parts by weight of deionized water to the stripped dispersion. The resultant dispersion, now substantially free of organic solvent, had a total solids of 34.1 percent and a Brookfield viscosity of 6,000 centipoises at 100 rpm's. The resin itself was non-gelled and essentially free of NCO.

EXAMPLE XXII

A high acid value prepolymer was prepared from the following charge:

| Charge | Parts by Weight |
| --- | --- |
| poly(1,4-butanediol adipate) | 1000 |
| dimethylol propionic acid | 402 |
| HYLENE W | 1360 |
| dibutyltin dilaurate | 1.38 |
| N-methyl pyrrolidone | 920 |

The above reactants were charged to a glass reaction vessel and heated to 90° C. under a nitrogen blanket. The temperature was held for 3 hours and then the reaction mixture was cooled to room temperature.

To a second reaction vessel was charged 112 parts by weight of triethylene diamine and 1495 parts by weight of deionized water. The water and amine were agitated to form a solution. Fifteen hundred thrity-five (1535) parts by weight of the acid-containing prepolymer at a temperature of 90° C. was added slowly to the amine-water solution to disperse and neutralize the resin. After addition of the resin, the resultant dispersion was of low viscosity and very clear. To the dispersed resin was added a solution of 29.4 parts by weight of an 85 percent aqueous solution of hydrazine hydrate and 30 additional parts by weight of deionized water to chain extend the resin. The viscosity appeared to increase at which time an additional 460 parts by weight of deionized water was added. The viscosity of the resin appeared high and the resin was clear. The dispersion had a pH of 7.6, a Brookfield viscosity of 20,000 centipoises at 100 rpm's, a total solids content of 31.1 percent and an acid value of 17.7. The resin as non-gelled and essentially free of unreacted NCO.

One thousand (1000) parts by weight of the above-described dispersion was then heated to 60° C. and then 7.2 parts by weight of N-hydroxyethyl ethylene imine was charged to the resin. The temperature was maintained at 60° C. for two hours and then the reaction mixture slowly cooled to room temperature.

The ethylene imine modification should improve the adhesive characteristics of the dispersion and also the pigment dispersibility. The resultant dispersion had a total solids content of 33.4 percent, a pH of 8.2, and a Brookfield viscosity of 22,800 centipoises at 100 rpm's.

EXAMPLE XXIII

An acid-containing, NCO-containing prepolymer was prepared from the following charge:

| Charge | Parts by Weight |
| --- | --- |
| poly(epsilon-caprolactone) diol (molecular weight = 704) | 704 |
| HYLENE W | 524 |
| dibutyltin dilaurate | 0.6 |
| N-methyl pyrrolidone | 410 |

The materials were charged to a glass reaction vessel and heated at 90° C. for three hours.

This prepolymer (164 parts) was then combined with a hydroxy-containing acrylic polymer (described below) and HYLENE W in the following charge ratio and heated at 94° C. for one hour.

| Charge | Parts by Weight |
| --- | --- |
| prepolymer | 164 |
| acrylic polyol | 76 |
| HYLENE W | 52.4 |

The poly (epsilon-caprolactone) diol was prepared as described in Example III, that is, from ring opening epsilon-caprolactone with dimethylol propionic acid in a 1/5 molar ratio.

The acrylic polyol was prepared by adding a mixture of 120 parts acrylic acid, 40 parts of hydroxyethyl acrylate, 1840 parts by weight of ethyl acrylate, 12 parts by weight of azobisisobutyronitrile (VAZO) and 200 parts by weight of N-methyl pyrrolidone slowly to 600 parts by weight of N-methyl pyrrolidone in a suitable reactor under a nitrogen atmosphere. Addition was complete after three hours and was followed by the addition of a mixture of 60 parts by weight of N-methyl pyrrolidone and 3 parts by weight of VAZO. The temperature during addition being maintained at 120° C. This was followed by the further addition of 3.6 parts of bisperoxyisopropylcarbonate (BPIC). The reaction mixture was then cooled to room temperature. The resultant acrylic polyol had an acid value of 32.1, a percent total solids of 69.4 percent and a hydroxyl number of 8.4.

The acid-containing prepolymer was added to a lined paint can containing an aqueous solution of 12.5 parts by weight of triethylene diamine (sufficient for 80 percent total theoretical neutralization), 14.6 parts by weight of an 85 percent by weight aqueous solution of hydrazine hydrate and 340 parts by weight of deionized water. The prepolymer dispersed and during addition of the prepolymer, the viscosity of the dispersion increased readily. An additional 150 parts by weight of deionized water was added to thin the viscosity. The resultant dispersion was off-white in color.

The dispersion was placed on a steel panel and drawn down with a 3-mil draw bar. The coating was cured for 20 minutes at 93° C. and the resultant cured coating had a Sward hardness of 32. The acetone resistance of the resultant coating, however, was quite poor.

Forty (40) grams of a dispersion was then combined with 1.3 parts by weight of CYMEL 370 curing agent which is a melamine-formaldehyde resin commercially available from American Cyanamid. The resin plus curing agent was then deposited on a steel substrate and drawn down with a 3-mil draw bar. The coating was cured for 30 minutes at 80° C. The acetone resistance of the cured coating was fair and the Sward hardness was 22.

EXAMPLE XXIV

An NCO-containing, acid-containing prepolymer was preared from the following charge:

| Charge | Parts by Weight |
| --- | --- |
| poly(epsilon-caprolactone) diol | 256 |
| fatty acid ester of pentaerythritol | 110 |
| HYLENE W | 174 |
| dibutyltin dilaurate | 0.27 |
| N-methyl pyrrolidone | 180 |

The poly (epsilon-caprolactone) diol was made from ring opening epsilon-caprolactone with dimethylol propionic acid as generally described in Example I in a 1/10 molar ratio.

The fatty acid ester is made by charging 717 parts by weight of pentaerythritol, 2695 parts by weight of safflower fatty acid and 122 parts by weight of xylene to a 5-liter flask and heating to reflux until an acid value of less than 5 is obtained.

The above charge was heated to 90° C. under a nitrogen blanket for about 3½ hours to form the prepolymer.

Three hundred sixty (360) parts by weight of the prepolymer was then charged to a lined paint can containing an aqueous solution of 7.8 parts by weight of triethylene diamine (sufficient for 70 percent of the total theoretical neutralization) dissolved in 410 parts by weight of deionized water. The resin dispersed and the viscosity increased as the resin was added. An additional 100 parts by weight of water was added to thin the viscosity. The resultant dispersion was slightly cloudy.

To the dispersion was added dropwise a solution of 7.5 parts by weight of an 85 percent by weight aqueous solution of hydrazine hydrate and an additional 7.5 parts by weight of deionized water. Upon the initial addition of the hydrazine hydrate, the viscosity decreased and then began to increase. An additional 50 parts by weight of water was added to thin the viscosity. The resultant dispersion had a total solids content of 30 percent by weight and a Brookfield viscosity of 3850 centipoises at 100 rpm's. The pH of the dispersion was 7.9. The resin was non-gelled and free of unreacted NCO.

The above procedure for neutralization and dispersion was repeated with the exception that only 4.5 parts by weight of triethylene diamine was used (sufficient for 40 percent by weight of the neutralization). The resultant dispersion had a much lower viscosity, having a Brookfield viscosity of 130 centipoises at 100 rpm's. The resin had a total solids content of 34.5 percent, appeared to be stable and off-white in color. The pH of the dispersion was 7.8.

EXAMPLE XXV

A self-curing, poly (urethane-urea) lacquer, containing blocked isocyanate groups, was prepared as follows: 300 parts by weight of an NCO-containing, acid-containing prepolymer prepared as described in Example III and heated to 50° C. was charged to a solution of 10.4 parts by weight of triethylene diamine and 295 parts by weight of deionized water to neutralize and disperse the prepolymer. The resultant dispersion was practically clear. To the dispersion which was at a temperature of 46° C. was added 22.1 parts by weight of methyl ethyl ketoxime to block residual NCO groups. The resultant dispersion had a pH of 8.0, percent total solids of 37 and a Brookfield viscosity of about 530 centipoises at 100 rpm's. The resin was non-gelled and free of unreacted NCO. When the resin was applied to a steel panel and baked 30 minutes at 121° C., a cured solvent-resistant coating resulted.

EXAMPLE XXVI

Four hundred ten (410) parts by weight of an acid-containing, NCO-containing prepolymer prepared as described in Example III was neutralized and dispersed by adding it to a solution of 15.5 parts by weight of triethylene diamine and 418 parts by weight of deionized water at a temperature of 80 to 90° C. with stirring.

To the neutralized dispersion was added 37 parts by weight of N-(2-aminoethyl)-3-aminopropyltriethoxysilane and 37 parts by weight of N-methyl-2-pyrrolidone dropwise to the resin dispersion. An additional 130 parts by weight of deionized water was added to thin the dispersion.

The viscosity of the final dispersion was 460 centipoises at 100 rpm's and the dispersion appeared to have small particles of resin. The dispersion had a total solids content of 31.7 part by weight and a pH of 8.20.

The chain extender introduces alkoxy silane groups into the polymer which can react with other similar groups on the polymer to give a resultant crosslinked coating. A crosslinked coating resulted when a coated panel was heated for 30 minutes at 121° C.

EXAMPLE XXVII

A poly(urethane-urea) lacquer prepared as described in Example VIII was cured with various urea-formaldehyde resins in the following proportions by weight:

|  | A | B | C |
|---|---|---|---|
| poly(urethane-urea) lacquer | 25 | 25 | 25 |
| FORMITE 240 (Rohm & Haas) | .05 | | |
| RESIMENE X-970 (Monsanto) | | .06 | |
| RESIMENE X-980 (Monsanto) | | | 0.05 |

Each of the curable compositions prepared as described above were deposited on steel panels and drawn down with 3-mil draw bars. One sample was baked at 150° C. for 30 minutes and the other sample was air dried. The solvent resistance of the film was as follows:

| | Solvent Resistance | |
|---|---|---|
| | Acetone | Ethyl Alcohol |
| A | good | fair |
| B | good[1] | fair[2] |
| C | good | fair |
| Example VIII | good | fair |

[1]Good solvent resistance means coating is unaffected by 20 double rubs with solvent-wetted cloth.
[2]Fair solvent resistance means coating somewhat attacked by 20 double rubs with solvent-wetted cloth.

EXAMPLE XXVIII

The resin of Example VIII was applied at a 3-mil width thickness over a glass plate. The coated plate was then placed in an 800 watt microwave oven and the coating irradiated for a total of 5 minutes on a 30-second cycle (30 seconds on, 30 seconds off). At the end of this time, the coating was hard and had good solvent resistance.

EXAMPLE XXIX

An electrodeposition bath based on the resin of Example VIII was prepared from the following:

| Ingredient | Parts by Weight |
|---|---|
| resin (Example VIII) | 100 |
| TiO$_2$ | 14 |
| 2-ethylhexanol | 17 |
| water | 240 |

Using this bath at a temperature of 80° F. (27° C.), untreated aluminum panels were electrodeposited at 250 volts to produce films of 0.8 mil thickness. At 150 volts under similar conditions, films of 0.4 mil thickness were obtained. After baking the coated panels for 20 minutes at 200° F. (93° C.), very hard, smooth, semi-glossy coatings were obtained. In a similar manner, phosphated treated steel panels rinsed with chromic acid gave similar results.

EXAMPLE XXX

A cationic poly(urethane-urea) lacquer was prepared as follows: 400 parts by weight of a 1000 molecular weight poly(1,4-butanediol adipate) was charged to a suitable reaction vessel along with 85.7 parts by weight of methyl diethanolamine, 0.44 parts by weight of dibutyltin dilaurate urethane-forming catalyst, 3.88 parts by weight of N-methyl pyrrolidone solvent and 419 parts by weight of HYLENE W. The reaction mixture was heated to 95° C. under a nitrogen atmosphere for a 4½ hour period. The reaction mixture was then cooled to room temperature and the NCO-polymer which was formed was quaternized with 100.8 parts by weight of dimethyl sulfate. The quaternizing agent was added to the reaction mixture in a dropwise fashion. After quaternizing the NCO-containing polymer, it was thinned by combining it with 280 parts by weight of N-methyl pyrrolidone. The thinned NCO-containing polymer was dispersed and chain extended by charging it to a solution of 24 parts by weight of hydrazine hydrate dissolved in 1245 parts by weight of deionized water. The mixture dispersed very well, increasing in viscosity halfway through addition such that an additional 2500 parts by weight of water were added during the addition to reduce the viscosity. The final dispersion had a solids content of 19.8 percent, a pH of 6.75, a Brookfield viscosity at 23° C. (1000 rpm's) of 4200 centipoises. The resin was essentially free of NCO groups as determined by an infrared scan.

EXAMPLE XXXI

Thirty-three (33) parts by weight of the aqueously dispersed polyurethane prepared as described in Example VIII was mixed with 200 parts by weight of a 40 percent total solids acid solubilized sunflower oil alkyd resin and one part by weight of dimethanol ethanolamine. The reaction mixture was then thinned with 20 parts of deionized water.

We claim:

1. A non-sedimenting aqueous dispersion which is emulsifiable in the absence of added emulsifier of an ungelled polyurethane having a finely particulated dispersed phase of less than 10 microns which requires only mild agitation for dispersion formed by reacting in aqueous medium in which water is the principal ingredient:
   (A) NCO-containing polymer containing anionic salt groups having monovalent counter ions and having a salt group equivalent weight of 200 to 5000 being substantially free of highly active hydrogens, and having a viscosity of 50 to 10,000 centipoises, said polymer formed from:
     (1) an organic polyisocyanate and
     (2) an active hydrogen-containing material containing at least 2 active hydrogens per molecule,
   said organic polyisocyanate and said active hydrogen-containing compound containing a total of not more than 1 gram-mole of compounds having a functionality of 3 or more per 500 grams of organic polyisocyanate and active hydrogen-containing material; the equivalent ratio of NCO in (1) to active hydrogen in (2) being at least about 4/3; the anionic salt groups introduced into said NCO-containing polymer through the active hydrogen-containing material (2);
   (B) active hydrogen-containing material in which the active hydrogens are more reactive with NCO groups than water to form a polyurethane having an intrinsic viscosity less than 4.0 deciliters per gram; said aqueous dispersion containing at least 15 percent by weight aqueous medium based on total weight of ungelled polyurethane and aqueous medium of which at least 30 percent by weight of the aqueous medium is water with co-solvent constituting the remainder of the aqueous medium.

2. The dispersion of claim 1 in which the anionic salt groups are carboxylic acid salt groups.

3. The dispersion of claim 1 in which the NCO-containing polymer contains no more than 50 percent by weight of ethylene oxide moieties.

4. The dispersion of claim 1 in which the NCO-containing polymer is dissolved in about 5 to 60 percent by weight organic solvent; the percentage by weight being based on total weight of solvent and NCO-containing polymer.

5. The dispersion of claim 4 in which the organic solvent is water-soluble and at least part of the solvent has a boiling point above 150° C.

6. The dispersion of claim 1 in which either the organic polyisocyanate, the active hydrogen-containing material (2) or the active hydrogen-containing material (B) is trifunctional.

7. The dispersion of claim 1 in which the organic polyol contains at least in part a polyester polyol.

8. The dispersion of claim 6 in which the equivalent ratio of organic polyisocyanate to active hydrogen-containing compound groups is within the range of 6 to 1.8:1.

9. The dispersion of claim 1 in which the dispersed phase has a particle size of 5 microns or less.

10. The dispersion of claim 1 in which the NCO-containing polymer is reacted in said aqueous medium with a polyfunctional active hydrogen-containing compound having at least two hydrogens which are more reactive with NCO groups than water.

11. The dispersion of claim 1 in which (B) is a primary or secondary polyamine.

12. The dispersion of claim 11 in which the polyamine is a diamine.

13. The dispersion of claim 1 in which (B) is a hydrazine, a substituted hydrazine or a hydrazine reaction product.

14. The dispersion of claim 11 in which the active hydrogen-containing compound is an alkanolamine.

15. The dispersion of claim 1 in which the polyruethane contains unsaturated fatty acid moieties.

16. The dispersion of claim 1 which contains curing groups in the polymer molecule.

17. The dispersion of claim 16 in which the curing groups are selected from the class consisting of N-alkoxymethyl moieties, blocked isocyanate moieties, masked isocyanate moieties, alkoxysilane moieties, and moieties containing ethylenic unsaturation.

18. The dispersion of claim 16 which is applied as a coating and treated with microwave with or without ultraviolet radiation.

19. An aqueous coating composition comprising:
   (A) a non-sedimenting aqueous dispersion which is emulsifiable in the absence of added emulsifier of an ungelled NCO-free polyurethane having a finely particulated dispersed phase of less than 10 microns which requires only mild agitation for dispersion formed by reacting in aqueous medium in which water is the principal ingredient:
     (1) an NCO-containing polymer containing anionic salt groups having a salt group equivalent weight of 200 to 5000 and having monovalent counter ions being substantially free of reactive active hydrogens and having a viscosity of 50 to 10,000 centipoises, said polymer formed from:
       (i). an organic polyisocyanate and
       (ii). an organic material containing at least two active hydrogens
     said organic polyisocyanate and said organic active hydrogen-containing material containing a total of not more than one gram-mole of compounds having a functionality of 3 or more per 500 grams of organic polyisocyanate and organic material containing at least 2 active hydrogens; said NCO-containing polymer containing an equivalent ratio of NCO in (i) to active hydrogen in (ii) of at least about 4/3, the anionic salt groups introduced into said NCO-containing polymer through (ii),
     (2) an active hydrogen-containing compound having at least one hydrogen more reactive with NCO groups than water having an average functionality of 2 or less to form a polyurethane having an intrinsic viscosity lower than 2.0 deciliters per gram;
   said aqueous dispersion containing at least 15 percent by weight aqueous medium based on total weight of polyurethane and aqueous medium of which at least 30 percent by weight of the aqueous medium is water with co-solvent constituting the remainder of the aqueous medium;
   (B) a curing agent.

20. The composition of claim 19 in which the polyurethane of (A) contains hydroxyl groups.

21. The composition of claim 19 in which the curing agent is selected from the class consisting of aminoplast, polyisocyanates, phenolic resin or epoxy-containing materials.

22. The composition of claim 19 in which the polyurethane contains reactive amine groups.

23. The composition of claim 22 in which the curing agent is an epoxy-containing material or a polyisocyanate.

24. The composition of claim 19 which is applied as a coating and treated with microwave with or without ultraviolet radiation.

25. The dispersion of claim 1 which is applied as a coating by electrodeposition.

26. The dispersion of claim 1 which is applied as a coating by electrostatic spraying.

27. The dispersion of claim 1 in which salt formation takes place when the prepolymer is dispersed in aqueous medium.

28. The dispersion of claim 1 in which the NCO-containing polymer solution has a viscosity of from about 100 to 5000 centipoises.

29. The dispersion of claim 1 in which the aqueous dispersion contains 20 to 70 percent by weight aqueous medium based on total weight of polyurethane in aqueous medium of which at least 40 percent by weight of the aqueous medium is water with co-solvents constituting the remainder of the aqueous medium.

30. The dispersion of claim 1 in which the active hydrogens in (2) are selected from the class consisting of —OH, —SH, —NH, and —NH$_2$ including mixed groups.

31. A method of forming a non-sedimenting aqueous dispersion of an ungelled polyurethane which is emulsifiable in the absence of added emulsifier comprising:

(A) preparing an NCO-containing polymer containing anionic salt groups or groups which are readily converted to anionic salt groups in aqueous medium, said salt groups having monovalent counter ions, said NCO-containing polymer being formed from
(1) an organic polyisocyanate and
(2) an active hydrogen-containing material containing at least two active hydrogens per molecule, said organic polyisocyanate and said active hydrogen-containing material containing a total of not more than one gram-mole of compounds having a functionality of 3 or more per 500 grams of organic polyisocyanate and active hydrogen-containing material; the equivalent ratio of NCO in (1) to active hydrogens in (2) being at least about 4/3; the anionic salt groups or groups which are readily converted to anionic salt groups introduced into said NCO-containing polymer through the active hydrogen-containing material (2); said NCO-containing polymer being substantially free of highly active hydrogens and having a viscosity of 50 to 10,000 centipoises;

(B) dispersing said NCO-containing prepolymer in aqueous medium in which water is the principal ingredient, said NCO-containing polymer having an anionic salt group equivalent weight of from 200 to 5000 in said aqueous medium;

(C) chain extending the dispersed NCO-containing prepolymer with an active hydrogen-containing material in which the active hydrogens are more reactive with the NCO groups than water to form a polyurethane having an intrinsic of less than 4.0 deciliters per gram; said chain extension occurring to form an ungelled polyurethane dispersion having a finely particulated dispersed phase of less than 10 microns and in which the dispersion contains at least 15 percent by weight aqueous medium based on total weight of the ungelled polyurethane and aqueous medium of which at least 30 percent by weight of the aqueous medium is water, the co-solvent constituting the remainder of the aqueous medium.

32. The method of claim 31 in which the anionic salt groups are formed when the NCO-containing polymer is dispersed in the aqueous medium.

* * * * *